US012684109B2

(12) United States Patent
Browne et al.

(10) Patent No.: US 12,684,109 B2
(45) Date of Patent: Jul. 14, 2026

(54) AUGMENTED REALITY SYSTEM WITH FAIL-SAFE DIRECT VIEW MODE

(71) Applicant: Vision Products, LLC, Campbell, CA (US)

(72) Inventors: Michael P. Browne, San Mateo, CA (US); Kevin Mellott, San Jose, CA (US)

(73) Assignee: Vision Products, LLC, Campbell, CA (US)

( * ) Notice: Subject to any disclaimer, the term of this patent is extended or adjusted under 35 U.S.C. 154(b) by 0 days.

(21) Appl. No.: 18/660,119

(22) Filed: May 9, 2024

(65) Prior Publication Data

US 2025/0240401 A1 Jul. 24, 2025

Related U.S. Application Data

(60) Provisional application No. 63/623,460, filed on Jan. 22, 2024.

(51) Int. Cl.
*H04N 13/344* (2018.01)
*G02B 27/01* (2006.01)
(Continued)

(52) U.S. Cl.
CPC ......... *H04N 13/398* (2018.05); *H04N 13/106* (2018.05); *H04N 13/194* (2018.05); *H04N 13/344* (2018.05); *H04N 13/361* (2018.05); *G02B 27/01* (2013.01); *G02B 2027/0138* (2013.01); *G02B 2027/014* (2013.01); *G02B 2027/0167* (2013.01); *G02B 27/017* (2013.01); *G02B 27/0172* (2013.01); *G02B 27/0176* (2013.01); *G02B 2027/0178* (2013.01)

(58) Field of Classification Search
CPC .. H04N 13/398; H04N 13/106; H04N 13/194; H04N 13/344; H04N 13/361; G02B 27/0172; G02B 2027/0178; G02B 27/01; G02B 2027/0138; G02B 2027/014; G02B 2027/0167; G02B 27/017; G02B 27/0176
See application file for complete search history.

(56) References Cited

U.S. PATENT DOCUMENTS 3,410,629 A 11/1968 Carpenter et al.
4,698,857 A 10/1987 Kastendieck et al.
(Continued)

FOREIGN PATENT DOCUMENTS

JP 2010145674 7/2010
WO WO 2016/062302 4/2016

OTHER PUBLICATIONS

Moore, S.A., "Anamorphic Eyepiece for Increased Field of View", International Optical Design Conference (IODC), Jun. 13, 2010, 5 pages.

(Continued)

*Primary Examiner* — Douglas Wilson
(74) *Attorney, Agent, or Firm* — Knobbe, Martens, Olson & Bear, LLP

(57) ABSTRACT

Various AR systems include a fail-safe mode where the user can see the region in front of the user without the display and/or outward facing imaging sensor (e.g., camera), if for example, power to the display and/or outward facing imaging sensor (e.g., camera) is lost or the outward facing imaging sensor (e.g., camera) and/or display malfunction.

18 Claims, 14 Drawing Sheets

(51) Int. Cl.
    *H04N 13/106*     (2018.01)
    *H04N 13/194*     (2018.01)
    *H04N 13/361*     (2018.01)
    *H04N 13/398*     (2018.01)

(56)         References Cited

U.S. PATENT DOCUMENTS

| | | | |
|---|---|---|---|
| 5,140,416 A | 8/1992 | Tinkler | |
| 5,473,365 A | 12/1995 | Okamura | |
| 5,572,343 A | 11/1996 | Okamura et al. | |
| 5,726,807 A | 3/1998 | Nakaoka et al. | |
| 5,850,625 A | 12/1998 | Maren et al. | |
| 5,900,849 A * | 5/1999 | Gallery | G02B 27/017 |
| | | | 345/7 |
| 6,075,644 A | 6/2000 | Filipovich | |
| 6,201,641 B1 | 3/2001 | Filipovich | |
| 6,407,724 B2 | 6/2002 | Waldern et al. | |
| 6,462,894 B1 | 10/2002 | Moody | |
| 6,518,939 B1 * | 2/2003 | Kikuchi | H04N 13/398 |
| | | | 463/31 |
| 6,560,029 B1 | 5/2003 | Doobie et al. | |
| 6,653,989 B2 | 11/2003 | Nakanishi | |
| 6,757,008 B1 | 6/2004 | Smith | |
| 6,909,539 B2 | 6/2005 | Korniski et al. | |
| 6,947,219 B1 | 9/2005 | Ou | |
| 7,072,107 B2 | 7/2006 | Filipovich et al. | |
| 7,158,296 B1 | 1/2007 | Schwartz et al. | |
| 7,289,272 B2 | 10/2007 | Bowron et al. | |
| 7,307,793 B2 | 12/2007 | Ottney et al. | |
| 7,345,277 B2 | 3/2008 | Zhang | |
| 7,381,952 B2 | 6/2008 | Teich et al. | |
| 7,746,551 B2 | 6/2010 | Schwartz, II et al. | |
| 7,806,533 B2 | 10/2010 | Boute et al. | |
| 8,651,748 B2 | 2/2014 | vom Hagen et al. | |
| 8,736,967 B1 | 5/2014 | Browne et al. | |
| 8,817,196 B2 | 8/2014 | De La Tocnaye et al. | |
| 9,651,786 B1 | 5/2017 | Browne | |
| 10,371,944 B2 | 8/2019 | Mallinson | |
| 10,567,744 B1 | 2/2020 | Giguere et al. | |
| 10,705,343 B2 | 7/2020 | Xiao et al. | |
| 10,775,632 B1 * | 9/2020 | Chapalamadugu | F21V 9/08 |
| 10,957,279 B2 * | 3/2021 | Hobson | G09G 5/026 |
| 11,204,649 B2 | 12/2021 | Browne | |
| 11,513,358 B2 | 11/2022 | McDowall et al. | |
| 11,601,638 B2 | 3/2023 | Ratcliff et al. | |
| 11,669,161 B2 | 6/2023 | Jones et al. | |
| 11,733,530 B1 | 8/2023 | Wang et al. | |
| 11,750,794 B2 | 9/2023 | Benishti et al. | |
| 11,868,675 B2 | 1/2024 | Harviainen | |
| 12,248,146 B1 * | 3/2025 | Correa, Jr. | G06F 3/013 |
| 2003/0129567 A1 | 7/2003 | Cabato et al. | |
| 2003/0231804 A1 | 12/2003 | Bacarella et al. | |
| 2004/0227703 A1 | 11/2004 | Lamvik et al. | |
| 2005/0046702 A1 | 3/2005 | Katayama et al. | |
| 2008/0136923 A1 | 6/2008 | Inbar et al. | |
| 2008/0170119 A1 | 7/2008 | McCann | |
| 2008/0309774 A1 | 12/2008 | Goh et al. | |
| 2009/0051760 A1 | 2/2009 | Ottney | |
| 2009/0251680 A1 | 10/2009 | Farsaie | |
| 2010/0128135 A1 | 5/2010 | Filipovich et al. | |
| 2010/0128138 A1 | 5/2010 | Nitta et al. | |
| 2010/0245400 A1 * | 9/2010 | Nakahata | H04N 13/398 |
| | | | 345/55 |
| 2011/0102672 A1 | 5/2011 | Estrop | |
| 2012/0002064 A9 | 1/2012 | Filipovich et al. | |
| 2012/0119978 A1 | 5/2012 | Border et al. | |
| 2012/0182326 A1 | 7/2012 | Moore | |
| 2012/0257005 A1 | 10/2012 | Browne | |
| 2013/0234935 A1 | 9/2013 | Griffith | |
| 2014/0327962 A1 | 11/2014 | Teetzel et al. | |
| 2016/0025978 A1 | 1/2016 | Mallinson | |
| 2019/0025594 A1 * | 1/2019 | Holmer | G02B 27/0101 |
| 2019/0293937 A1 | 9/2019 | Ma | |
| 2021/0168270 A1 | 6/2021 | Browne | |
| 2022/0147149 A1 * | 5/2022 | Browne | G06F 3/017 |
| 2022/0317450 A1 | 10/2022 | Deltel | |
| 2024/0272726 A1 | 8/2024 | Browne et al. | |
| 2025/0175585 A1 * | 5/2025 | Zhang | H04N 13/383 |

OTHER PUBLICATIONS

Wilburn, "High Performance Imaging Using Arrays of Inexpensive Cameras", A Dissertation Submitted to the Department of Electrical Engineering and The Committee on Graduate Studies of Stanford University in Partial Fulfillment of the Requirements for the Degree of Doctor of Philosophy, 2004.

* cited by examiner

AUGMENTED REALITY SYSTEM WITH FAIL-SAFE DIRECT VIEW MODE

This application claims priority to U.S. Provisional Application No. 63/623,460 titled "CAMERA-BASED AUGMENTED REALITY SYSTEM WITH FAIL-SAFE DIRECT VIEW MODE", which was filed on Jan. 22, 2024 and is expressly incorporated herein by reference in its entirety.

BACKGROUND

Field

Various embodiments of this application relate to improved head mounted displays configured to provide augmented reality, and in particular, to head mounted displays configured to monitor when the head mounted display is malfunctioning and to revert to a mode where the wearer can simply see through the eyepieces during such situations.

Description of the Related Art

Advances in display technologies and mobile computing systems have facilitated the development of augmented reality (AR) systems that can present a user with a view of the real physical world that surrounds the user augmented with computer-generated information such as text, data, graphics, images, video, etc. Examples of such information may include, maps, GPS data, photos. This supplemental content may be presented in a manner wherein the user perceives the computer-generated information to be superimposed on and/or adjacent to the view of the real-world objects in front and/or surrounding the user.

Naturally, such head mounted displays may fail to operate in certain circumstances. One or more of the components of the system such as the display or camera may malfunction and/or power may simply no longer be provided (e.g., a battery may be depleted of power). Since the system is not working at that moment, the user may remove the head mounted display. Improvements in such systems may therefore be beneficial.

SUMMARY OF THE INVENTION

Various AR systems described herein provide head mounted displays that are configured to respond to the situation where one or more components of the head mounted display are not operating properly. While images may not be able to be displayed for some such reason, the head mounted display nevertheless permits the user to continue wearing the head mounted display and to be able to see the environment in front of the user by directly viewing through the eyepiece of the head mounted display. This feature is particularly useful for certain head mounted displays such as described herein that provide electronic augmented reality wherein an outward facing imaging sensor such as a camera images the environment in front of the user and provides video signals to the display in the eyepiece of the head mounted display to display this video of the environment in front of the user to the user's eye for viewing. In certain designs, a shutter may block the view of the user through the eyepiece of the head mounted display as the view of the environment in front of the user is provided via the outward facing imaging sensor (e.g., outward looking camera). This shutter may provide higher quality images to be displayed as the shutter, by blocking ambient light, will permit black to appear to the user darker and/or blacker and/or may reduce or prevent the image presented by the display from being washed out by bright light in front of the user. However, when the outward facing imaging sensor (e.g., camera) and/or display fail to operate correctly, having the shutter, which obstructs the view directly in front of the user, in the closed position may be undesirable. Various AR systems described herein include designs to address such situations.

For example, various AR systems described herein include a fail-safe mode where the user can see the region in front of the user without the display and/or outward facing imaging sensor, if for example, power to the display and/or outward facing imaging sensor (e.g., outward facing camera) is lost or the outward facing imaging sensor (e.g., camera) and/or display malfunction. In particular, the HMD is configured to provide a direct view of the region forward or in front of the user when the shutter is opened. In various implementations disclosed herein, the electrically switchable shutter can additionally be configured to open if power is lost and/or not applied to the shutter or if disruption or degradation of the video images captured by the outward facing imaging sensor and/or displayed by the display are detected. Likewise, in general, the user can see the region forward of the user by viewing images captured by the outward facing imaging sensor (e.g., camera) and displayed on the display while the shutter is closed. However, if power is lost and/or the outward facing imaging sensor (e.g. camera) and/or display malfunction, and the display and/or outward facing imaging sensor (e.g. camera) cannot operate as a result, the shutter will open providing a direct view of the region forward of the user.

Various designs and methods described herein comprise, for example, a head mounted display configured to provide an image for viewing by a user wearing the head mounted display. The head mounted display comprises a frame configured to be worn by the user and a display supported by the frame. The display is configured to output light to form images. The head mounted display further comprises a beam combiner that is partially reflective and partially transmissive, an electrically switchable shutter having a closed state that blocks light, and circuitry configured to control the shutter. An outward facing imaging sensor faces an area forward of the shutter to capture images of the area forward of the shutter for presentation of the images on the display for viewing by the eye. The electrically switchable shutter is disposed in an optical path between the beam combiner and the area forward of the shutter. The beam combiner is positioned (i) in an optical path of the light output by the display such that at least a portion of the light from the display propagates to the beam combiner and then to the eye of the user to form images produced by the display that are viewable by the eye and (ii) in an optical path of light from the area forward of the shutter such that at least a portion of the light from the area forward of the shutter propagates to the beam combiner and then to the eye when the shutter is open. The circuitry is configured to detect degradation or disruption in imaging and/or display and to cause the shutter to be open in response to the degradation or disruption being detected.

Another head mounted display disclosed herein and configured to provide an image for viewing by a user wearing the head mounted display also comprises a frame configured to be worn by the user and a display supported by the frame. The display is configured to output light to render images. The head mounted display also further comprises a beam combiner that is partially reflective and partially transmissive, an electrically switchable shutter having a first closed state that blocks light, and electronics configured to control the shutter. An outward facing imaging sensor facing an area forward of the shutter is configured to capture images of the area forward of the shutter and to present the images on the display for viewing by the eye. The electrically switchable shutter is disposed in an optical path between the beam combiner and the area forward of the shutter. The beam combiner is positioned (i) in an optical path of the light output by the display such that at least a portion of the light from the display propagates to the beam combiner and then to the eye of the user to form images produced by the display that are viewable by the eye and (ii) in an optical path of light from the area forward of the shutter such that at least a portion of the light from the area forward of the shutter propagates to the beam combiner and then to the eye when the shutter is open. The electronics includes an override mode wherein the electronics is configured to open the shutter in response to user input such that the user can view the area forward of the shutter through the open shutter. At least during the override mode, the electronics is configured to monitor light levels of the area forward of the shutter for an increase beyond a threshold amount. The electronics are configured to close the shutter if said increase beyond a threshold amount is detected.

BRIEF DESCRIPTION OF THE DRAWINGS

In the following description of the various embodiments, reference is made to the accompanying drawings which form a part hereof, and in which is shown by way of illustration various embodiments of the device. It is to be understood that other embodiments may be utilized and structural changes may be made.

DETAILED DESCRIPTION OF THE PREFERRED EMBODIMENT

Figure 1:
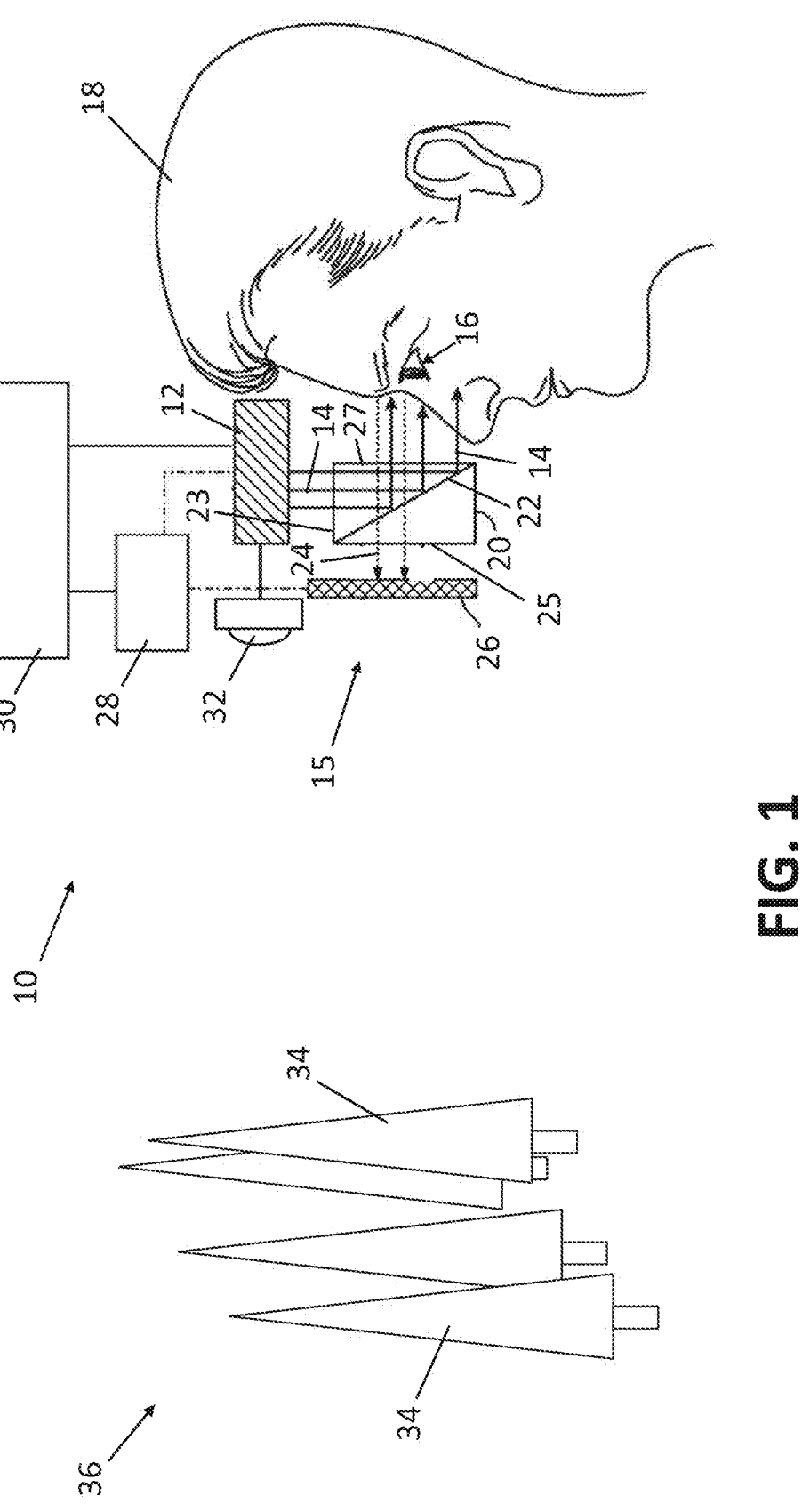
FIG. 1 is a schematic diagram depicting a head mounted display providing electronic augmented reality. The head mounted display includes a shutter to block ambient light from passing through the eyepiece to the viewer's eye. Such a shutter may, for example, by blocking this ambient light enable black features in the image content to appear to the user to be darker and/or blacker and/or may reduce the likelihood of the augmented display content from being washed out by bright light in front of the viewer.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied using a variety of techniques including techniques that may not be described herein but are known to a person having ordinary skill in the art. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein. It will be understood that when an element or component is referred to herein as being "connected" or "coupled" to another element, it can be directly connected or coupled to the other element or intervening elements may be present therebetween.

An AR system is described herein that may comprise, for example, a head mounted display (HMD) that includes a display configured to present images of at least a portion of the user's surroundings to the user wearing the HMD. In particular, this HMD may provide a view of the region forward or in front of the user by capturing video images of that region with an outward facing or outward looking imaging sensor, for example, an outward facing or outward looking camera possibly comprising an optical detector array and imaging optics such as one or more lenses, mounted on the HMD and displaying those captured video images to the user via the display. Additional information and/or image content can be also displayed on the display augmenting the video images captured by the outward facing imaging sensor. Such information can be superimposed on and/or juxtaposed with respect to objects in the images or video captured by the outward facing imaging sensor (e.g. camera) that are rendered on the display for the viewer.

The HMD additionally includes an electrically switchable shutter that is in the optical path of the eye through the eyepiece to the region forward or in front of the viewer. This electrically switchable shutter generally remains closed while the video images captured by the outward facing imaging sensor (e.g. outwardly facing camera) are being displayed to the user. The shutter can block light from the environment in front of the user, which would otherwise potentially wash-out images displayed to the user and make black features in images formed by the display more difficult to perceive as black. The result of using the shutter can be higher contrast in strong ambient lighting and black objects can appear more realistic. The black object or features in images formed by the display can be made opaque and darker and/or blacker as opposed to partially transparent. Additionally, the shutter is useful where objects or portions of objects that are intended to be blocked by augmented reality image content, can be excluded from the image instead of being partially visible through image content that is not completely opaque. Such effective occlusion can provide a more realistic portrayal or rendering of an object or part of an object being blocked by a virtual object or person that is in front of the object.

The HMD, however, includes a fail-safe mode where the user can see the region in front of the user without the display and/or outward facing imaging sensor, if for example, power to the display and/or outward facing imaging sensor (e.g. outward facing camera) is lost or the display or outward facing imaging sensor malfunction. In particular, the HMD is configured to provide a direct view of the region forward or in front of the user when the shutter is opened. Moreover, the electrically switchable shutter is configured to open in certain contingencies such as for example, if the outward facing imaging sensor is not operating or not operating properly, if the display is not functioning or malfunctioning or if power is lost and not applied components such as the outward facing imaging sensor (e.g. camera) or outward facing imaging sensor (e.g. camera) electronics or to the display or display electronics or to the shutter. Likewise, in general, the user can see the region forward of the user by viewing images captured by the outward facing imaging sensor or camera and displayed on the display while the shutter is closed. However, if the outward facing imaging sensor or camera or the display encounter a problem or power is lost, and the display and/or outward facing imaging sensor (e.g. outward facing camera) cannot provide useful images of the environment in front of the wearer as a result, the shutter will open providing a direct view of the region forward of the user to the user.

Figure 2:
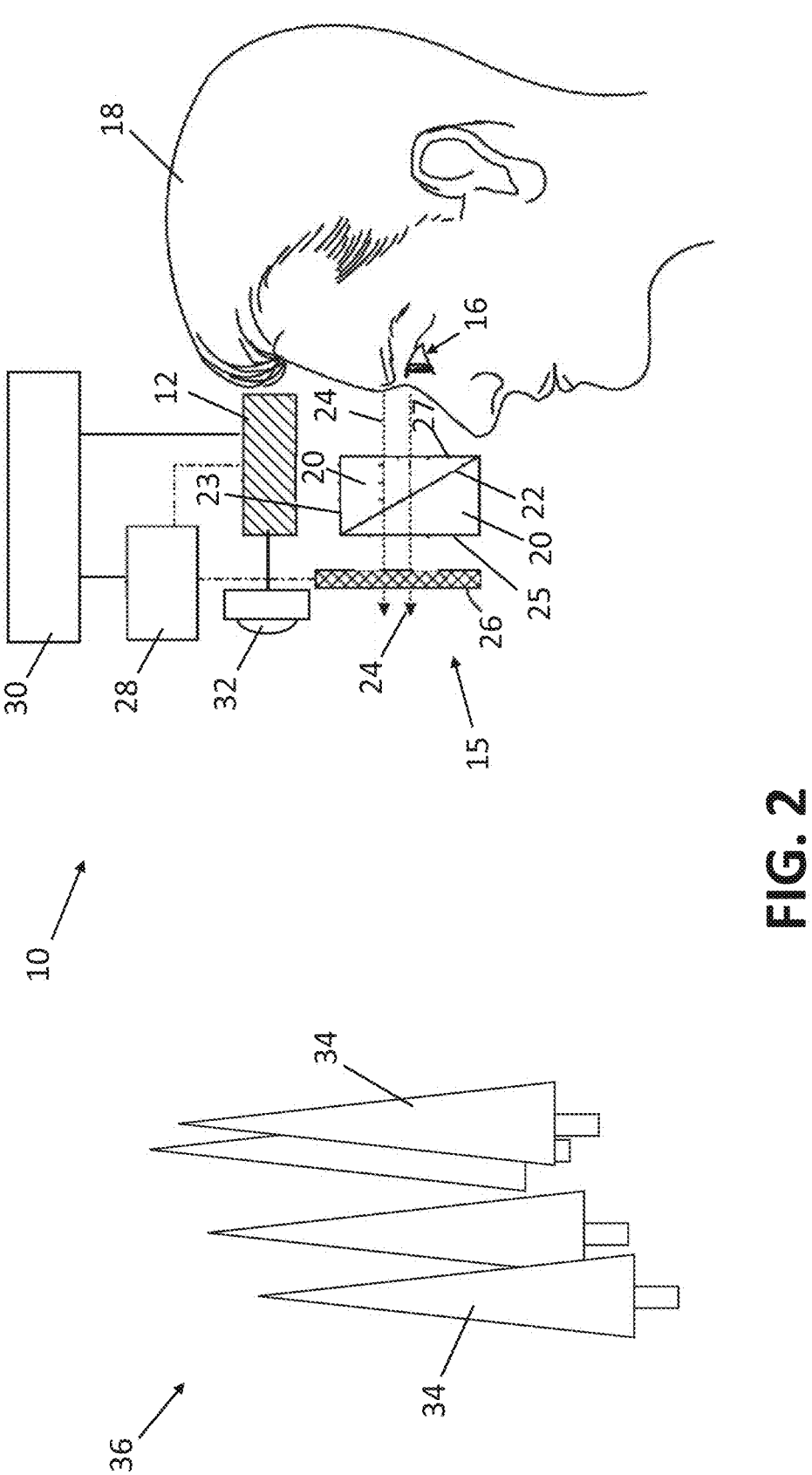
FIG. 2 schematically illustrating the head mounted display of FIG. 1 in an alternative mode that provides a view of the environment in front of the viewer via a direct view through the eyepiece when the shutter is open. The head mounted display may be configured to revert to this mode when the display and/or outward facing or outward looking imaging sensor or camera is not operating properly.

FIGS. 1 and 2 are schematic drawings that illustrate such an augmented reality system (e.g., HMD) in the two modes of operation described above. FIG. 1 shows an augmented reality system 10 comprising a display 12 such as a liquid crystal display (LCD) or an emissive display (e.g., a light emitting diode or LED display, an organic light emitting diode or OLED display, etc.) configured to output light 14 that can be directed to an eye 16 of a user 18 to form an image visible to the eye. Other examples of display may include Digital Micromirror Devices (DMDs), MicroLED, or MicroOLED displays, although other types of displays may be employed. The display may comprise a ferroelectric display or ferroelectric liquid crystal display. In some implementations, the display comprises a reflective display such as, for example, a reflected LCD or a DMD display. For waveguides, a display engine, which may comprise a miniature projector that also has a display therein, may inject light into the waveguide to form an image in the eye. The display 12 may comprise a plurality of pixels such as a two-dimensional array (2D array) of pixels that can be selectively activated to form an image. Light 14 selectively transmitted through, reflected from, and/or emitted by the display (e.g., the 2D array of pixels) may, for example, form an image on the retina of the eye 16 that is viewable by the user 18. The augmented reality system 10 includes an eyepiece 15 comprising a beam combiner 20 (e.g., beam-splitter) having a partially transmissive/partially reflective surface 22 disposed to direct the light 14 from the display 12 into the eye 16.

The partially transmissive/partially reflective surface 22 is partially transmissive such that the user 18 can see through the beam combiner 20 as indicated by forward directed arrows 24. As discussed above, however, the augmented reality system 10 includes an electrically switchable shutter 26 configured to be open to pass light or closed to block light. The switchable shutter 26 can form part of the eyepiece 15. In the mode shown in FIG. 1, the electrically switchable shutter 26 is closed such that the shutter blocks the view forward, for example, through the eyepiece 15, as schematically illustrated by the path of the arrows 24 being obstructed by the shutter. As shown, the shutter 26 is electrically connected to shutter electronics (e.g., a driver) 28 that can direct an electrical signal to the shutter to establish the state of the shutter. In various implementations, the shutter 26 is configured to be closed with application of an electrical signal (e.g., voltage) thereto, while the shutter is open when such signal (e.g., voltage) is removed. Likewise, with such designs, if electrical power is lost, the electrically switchable shutter 26 will default to an open state and the user can see through the eyepiece 15 in the forward direction. However, other designs are possible. For example, the shutter 26 may be configured to be closed with application of an electrical signal thereto, while the shutter is opened when such signal is removed. In an alternative design, the shutter 26 may be configured to be opened with application of an electrical signal thereto, while the shutter is closed when such signal is removed. In other designs, different signals are applied to the shutter to open and close the shutter. Still other variations may be possible. FIG. 1 further shows control electronics 30 in electrical communication with the shutter driver 28 and the display 12. The control electronics 30 may comprise a processor (e.g. a microprocessor and/or microcontroller), and/or one or more FPGAs and/or other circuitry configured to control the shutter state and/or the display 12. For example, the control electronics 30 may be configured to provide the appropriate signal(s) to open and/or close the shutter 26.

This augmented reality system 10 further comprises an outward facing or outward looking imaging sensor 32 such as an outward facing or outward looking camera comprising an outward facing detector or sensor array (2D optical detector array or optical sensor array) with imaging optics (e.g., one or more lens), for example, facing the forward direction so as to image objects 34 in a region 36 forward and/or in front of the user 18. The outward facing imaging sensor (e.g., outward facing camera) 32 may comprise, for example, a two-dimensional (2D) detector array comprising a two-dimensional array of light sensitive active areas such as photovoltaic regions (photodiodes) or photoconductive regions (photoconductors) and imaging optics such as one or more lenses positioned with respect to the optical detector array to form images on the optical detector array. In various designs, the 2D optical detector array comprises a CCD or CMOS detector array. Other types of outward facing or outward looking imaging sensors, however, are possible. For example, the outward facing imaging sensor may comprise a linear (1D) optical detector array comprising a linear array of photovoltaic or photoconductive regions (e.g., a linear CCD or CMOS array) and an optical scanner. A two-dimensional area of light may be imaged, for example, by collecting light from a smaller linear area (e.g., a strip) extending in a first direction and forming an image thereof on a linear array. The optical scanner may scan across a plurality of such linear areas extending across a second, e.g., orthogonal, direction to image a larger area. The outward facing imaging sensor (e.g., outward facing camera) 32 is shown electrically connected to the display 12 such that images such as video captured by the outward facing imaging sensor can be displayed on the display. In practice, the outward facing imaging sensor, e.g., camera, 32 and/or display 12 may include and/or be electrically connected to electronics such as imaging sensor or optical detector array electronics and/or display electronics for capturing and displaying images. Such electronics may comprise, for example, video processing electronics, a graphics driver or graphics driver electronics, a video driver or video driver electronics, a display driver or display driver electronics, sensor driver or sensor driver electronics or any combination of these.

As illustrated in FIG. 2, the shutter 26 has an open state where the shutter is transmissive such that the user 18 can view the region 36 forward or in front of the user. As discussed above, in various designs the head mounted display is configured such that the shutter 26 will be transmissive when the outward facing imaging sensor (e.g. camera) and/or display is malfunctioning or not operating. Likewise, in some designs, the shutter 26 is configured such that when power is not applied thereto, the shutter will be transmissive. Consequently, if power is lost or for other reasons the outward facing imaging sensor, e.g., outward facing camera, 32 and/or display 12 do not operate properly and do not present the user 18 with an image of the region 36 forward or in front of the user captured by the outward facing imaging 32, the user can nevertheless see through the shutter 26 to the region forward or in front of the user as represented by arrows 24. Such direct view of the region 36 forward or in front of the user 18 when the outward facing imaging sensor, e.g., camera 32 and/or display 12 are shut down because of loss of power provides a fail-safe for when power is lost, for example, due to exhaustion of battery power, or for other reasons. Similarly, the head mounted display can be equipped with fail safe modes where direct view of the region 36 forward or in front of the user 18 through the eyepiece 15 is provided when the outward facing imaging sensor, e.g., outward facing camera 32 and/or display 12 are not operating properly or are shut down.

Figure 3A:
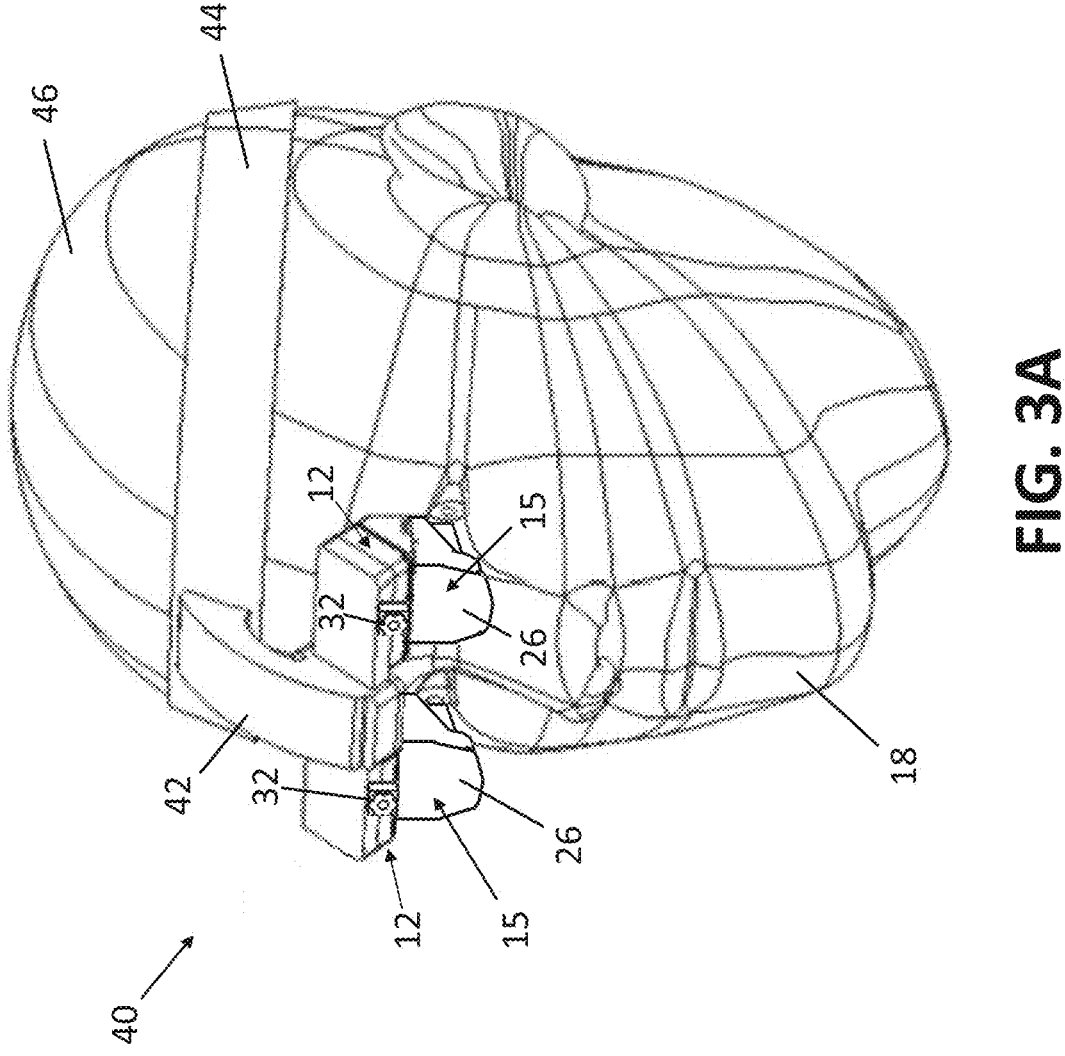
FIG. 3A is a perspective view of a head mounted display such as shown in FIG. 1 configured to provide electronic augmented reality. The head mounted display in FIG. 3A is shown in the as-worn position.
Figure 3B:
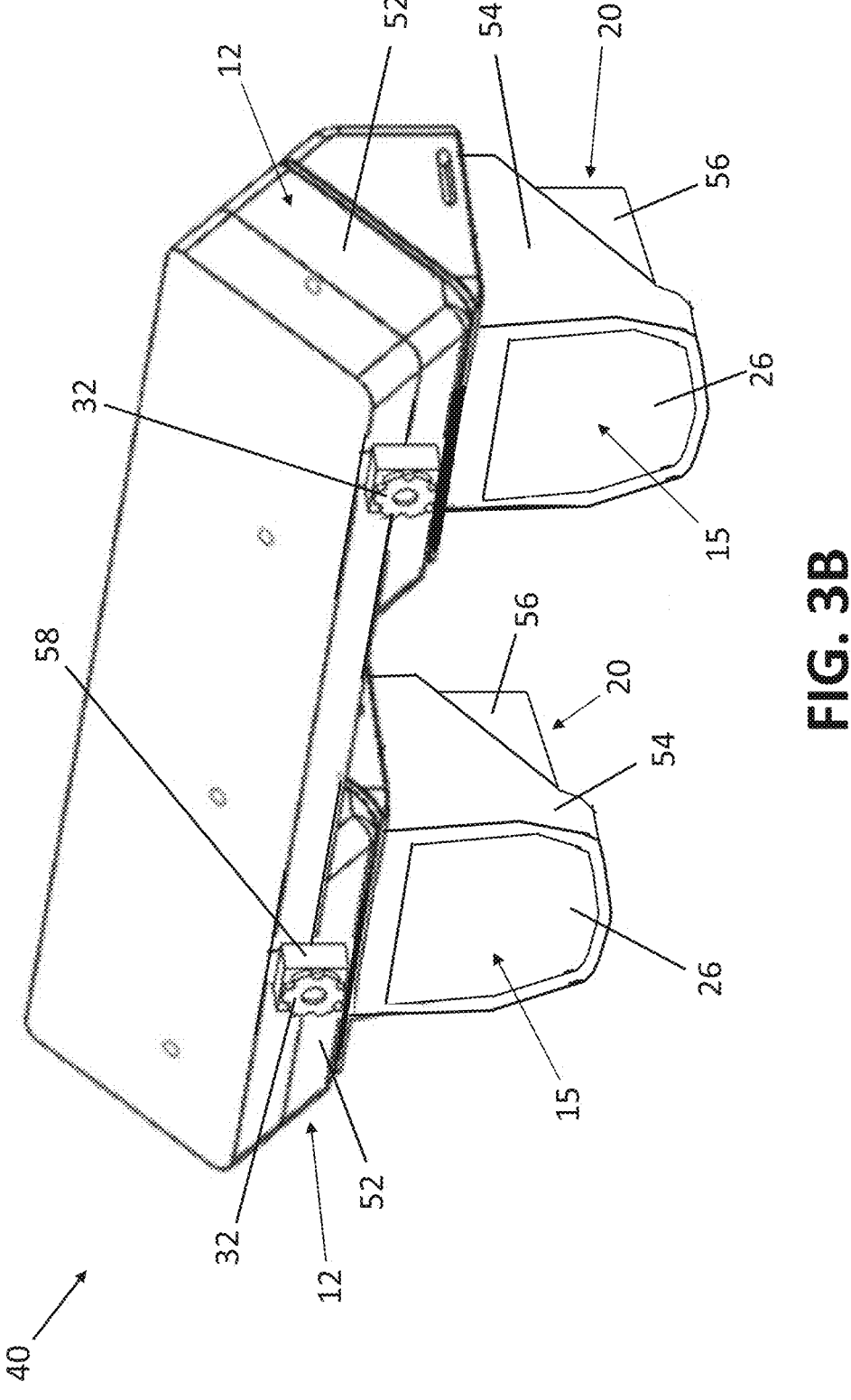
FIG. 3B is a close-up perspective view of the head mounted display similar to that shown in FIG. 3A.

As referenced above, the augmented reality system 10 may comprise a head mounted display (HMD) 40, such as shown in FIGS. 3A and 3B. For example, various components shown in FIGS. 1 and 2 can be supported on the head 46 of a user 18 by a frame 42 that may include a headband 44 that fits on the head of the user for supporting, for example, various optical and electrical components of the head mounted display 40. FIGS. 3A and 3B show locations of left and right displays 12, outward facing imaging sensors (e.g. cameras) 32, and eyepieces 15 for respective left and right eyes 16. The outward facing imaging sensors, e.g., outward facing cameras 32 face in the forward direction toward the region 36 in front of the user 18 and the user's eye 16 in this implementation. One or more of the components (e.g., display 12, eyepiece 15, beam combiner 20, outward facing imaging sensor, e.g., cameras 32, etc.) may be included in one or more housing. FIG. 3B, for example, shows a display housing 52 configured to house or contain a display 12 or at least a portion thereof as well as a shutter housing 54 configured to house or contain the shutter 26 or at least a portion thereof. In the example design shown, a beam combiner housing 56 houses or contains the beam combiner (e.g., a prism). An imaging sensor/camera housing 58 may house or contain the imaging sensor or camera 32. Variations are possible. For example, an eyepiece housing may house the eyepiece 15, e.g., the shutter and the beam combiner 20, in some implementations.

Figure 4:
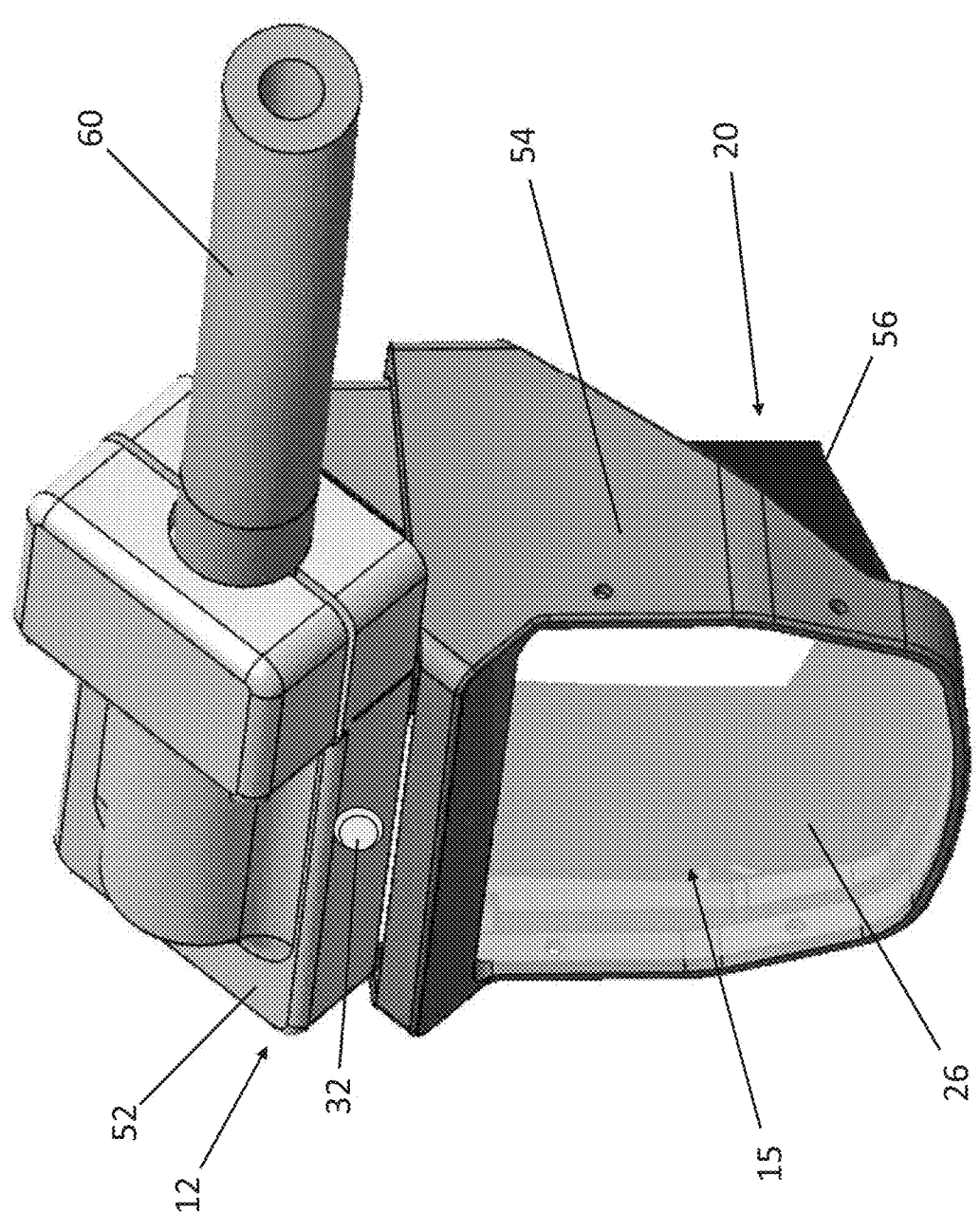
FIG. 4 is a close-up perspective view of an eyepiece for a head mounted display configured to provide electronic augmented reality. The eyepiece includes a shutter as discussed above.

FIG. 4 shows another design of a portion of the HMD 40 comprising a display 12 in a display housing 52, a shutter 26 in a shutter housing 54, and a beam combiner 20 in a beam combiner housing 56. A single eyepiece 15 is shown, however, left and right eyepieces 15 may be included in the head mounted display 40 in various implementations. FIG. 4 shows an outward facing imaging sensor, e.g., outward facing camera 32 positioned in this case to face in the forward direction. In some designs, multiple components (e.g., the display 12, outward facing imaging sensor, e.g., camera, 32, eyepiece 15, beam combiner 20, shutter 26, electronics, or any combination of these) may be included in a common housing and/or portions thereof. For example, in FIG. 4, the outward facing imaging sensor 32 is in part included in the display housing 52 in this design. FIG. 4 also shows an electrical cable 60 which may be electrically connected to electronics, for example, for providing power, controlling, and/or receiving output from the display 12.

As discussed above, the beam combiner 20 may comprise, in some designs, a prism. (Likewise, the beam combiner housing 56 may be referred to as a prism housing in some cases.) In various implementations, the prism includes a curved forward surface 25, a curved rearward surface 27 or possibly both. In some implementations, the beam combiner or prism 20 comprises a freeform beam combiner or freeform prism with one or more freeform surfaces. The beam combiner or prism 20 may include, for example, a curved freeform input face 23 proximally to and/or that received light from the display 12 (possibly at the top of the prism), a curved freeform forward surface 25 (closer to the object in front of the prism), a curved freeform rearward surface 27 (closer to the eye 16), or any combination of these. The partially transmissive partially reflective surface 22, which may be buried within the beam combiner or prism 20, may comprise a curved or freeform surface in some implementations. However, in some implementations any one or more of these surfaces 22, 23, 25, 27 may comprise a curved surface that is not a freeform surface or may comprise a flat surface. In some designs, however, the beam combiner 20 may comprise a plate such as a plane parallel plate, a waveguide, "bird bath" optics (e.g., comprising a curved possibly spherical partially transmissive mirror and a beam splitter such as a plate beamsplitter), pancake optics (e.g., transmissive optics comprising one or more lenses that also are designed to use reflection of light off one or more surfaces of the one or more lenses, a design that can reduce the thickness of the optics), or may comprise a visor. As shown in the example configuration depicted in FIGS. 1 and 2, the prism 20 may include a partially transmissive and/or partially reflective surface 22 that may be configured to reflect light from the display 12 into the eye 16 of the user 18 to display images therein. As shown in FIGS. 3A and 3B, a plurality of outward facing imaging sensors, e.g., cameras 32 may be employed, such as respective left and right imaging sensors or cameras above the left and right eyepieces 15 or beam combiners 20, although more or less outward facing imaging sensors or cameras may be employed and the outward facing imaging sensor(s) or camera(s) may be located elsewhere and/or pointed in other directions. Moreover, although two (e.g., left and right) eyepieces 15 and hence two beam combiners 20, shutters 26, displays 12 etc. are shown, the system may include more or less of these. For example, the augmented reality system 10 may include a single eyepiece 15 and and/or a single beam combiner 20 and/or single shutter 26 and/or display 12 etc. or any combination of these (e.g., in front of one eye or both eyes). Likewise, the system 10 may include more than two eyepieces 15, or beam combiners 20 or shutters 26 or displays, 12 etc. or any combination of these. For example, the eyepiece 15 and/or beam combiners 20 and hence possibly shutters 26 may be tiled across a larger area in front of the user's face, e.g., to provide for a wider field of view.

In various implementations, the head mounted display 40 may be configured to comply with mil-spec standards.

In various implementations, the shutter 26 comprises a low resolution spatial light modulator. The shutter 26 may, for example, be partitioned into less than 10 separately switchable regions, pixels, or elements. For example, the shutter 26 may be partitioned into less than 9, 8, 6, 5, 4, 3 or 2 separately switchable regions, pixels, or elements or any range formed by any of these values. In some designs, for example, the shutter 26 may comprise no more than a single switching element that can be switched between a state where single switching element is opaque and a state where the single switching element is transparent. In various implementations, this shutter 26 may expand across at least the area of the eyepiece 15 such that when the shutter is closed, the viewer cannot see directly through the eyepiece (or at least the clear aperture of the eyepiece and the associated usable optical area thereof) to the environment in front of the user. Likewise, in various implementations, this shutter 26 may expand across at least the area of the beam combiner such that when the shutter is closed, the viewer cannot see directly through the beam combiner 20 (or at least the clear aperture of the beam combiner and the associated usable optical area thereof) to the environment in front of the user. In some implementations, the shutter 26 has only the open state and the closed state and not one or more intermediate states where the shutter is partially open and partially closed or is dimmed. Additionally or alternatively, the shutter electronics 28 may be configured to provide only an open state and a closed state for the shutter and not one or more intermediate states where the shutter is partially open or partially closed or is dimmed. Accordingly, in various implementations, the head mounted display includes a first shutter state wherein the shutter is open and transparent and a second shutter state wherein the shutter is closed and opaque. The head mounted display does not have a state between the first and second shutter states wherein the shutter is less optically transmissive than the first open and transparent shutter state and more optically transmissive than the second closed and opaque shutter state.

In operation, the outward facing imaging sensor, e.g., camera 32, images the region 36 forward or in front of the user 18. The outward facing imaging sensor 32 captures images of objects 34 in the region forward of the user. Such objects 34 can be near and/or far, centrally located and/or in the periphery. The captured images, e.g., video, may be rendered on the display 12 that is viewable by the user 18, for example, wearing the head mounted display 40. In particular, light from the display 12 may be directed into the eye 16 of the user 18 to form images of the objects 34 in the user's eye. The shutter 26 may be in the closed state to block light from the region 36 forward of the user 18 from reaching the user's eyes 16 as such light may wash out the images presented to the user. With the shutter 26 in the closed state, black objects can also be rendered by not directing light into the user's eye 16 from certain portions of the display 12 (e.g., corresponding to the black portions of the image).

In various implementations, the shutter 26 remains closed for extended periods of time while a view of the region 36 forward or in front of the user 18 is presented to the user via the display 12, which displays images captured by the outward or forward facing image sensor, e.g., camera 32. For example, the shutter 26 may remain closed for at least a minute or in excess thereof. In some cases, the shutter 26 may remain closed for at least 5 minutes or in excess thereof. In some cases, the shutter 26 may remain closed for at least 10 minutes or in excess thereof. In some cases, the shutter 26 may remain closed for at least 15 minutes or any range formed by any of these values or in excess thereof.

The shutter 26 need not be continuously closed for such periods of time, however. For example, the shutter 26 may be opened for sufficiently short periods of time that the user's eye 16 does not perceive that the shutter was open. The shutter 26 may be modulated at a duty cycle wherein the shutter is closed more often on average than is open. Likewise, in various implementations, the shutter 26 may be closed on average for sufficient periods of time such that the user 18 does not perceive the area 36 forward or in front of the shutter by sensing light transmitted through the shutter. The system 10/HMD 40 may be configured such that the shutter 26 remains closed most of the time when in use. As discussed above, in cases where the power is lost or not being delivered and/or the display 12 and/or outward facing imaging sensor (e.g. camera) 32 are not properly operating, however, the shutter 26 opens such that the user can see the region 36 forward of the user's eye 16 through the eyepiece 15, e.g., the beam combiner 20 and the shutter. Nevertheless, when the system 10/HMD 40 has sufficient power and/or the display 12 and/or outward facing imaging sensor (e.g.

camera) 32 are functioning properly, the mode of operation may be to view the region 36 forward of the user 18 using the outward facing imaging sensor (e.g. camera) 32 and the display 12. Accordingly, the system 10 (e.g., the HMD 40) may be configured such that the shutter 26 remains closed on average for periods of time in excess of 1 minute. The system 10/HMD 40 may be configured such that the shutter 26 remains closed on average for periods of time in excess of 10 minutes. The system 10/HMD 40 may be configured such that the shutter 26 remains closed on average for periods of time in excess of 15 minutes, 20 minutes, 30 minutes, 40 minutes, 50 minutes, 60 minutes, 1.5 hours, 2.0 hours, 3.0 hours or any range formed by any of these values or possibly longer. In various implementations, the shutter 26 may be closed on average for sufficient periods of time such that the dark or black features in images do not appear washed out and may be darker and/or more black.

As described above, in some designs, the system 10 may be configured such that the shutter 26 is opened when power is lost or not delivered. Similarly, the system 10 may include circuitry to ascertain whether the outward facing imaging sensor (e.g. outward facing camera) 32 or display 12 or supporting electronics (e.g., display driver, graphic driver or video driver, and/or controller, etc.) are not functioning properly even if power was available or being delivered to one or more components. For example, if the display 12 or outward facing imaging sensor, e.g., outward looking camera 32 malfunctions or the outward facing imaging sensor gets obstructed or damaged or communication between the components get disrupted although the battery has not yet died, the circuitry may be configured to detect the degradation or disruption in the capturing of images or video by the outward facing imaging sensor and/or display of video or images by the display and/or the transmission of images or video from the outward facing imaging sensor to the display, and to set the shutter to be open in response.

Figure 5:
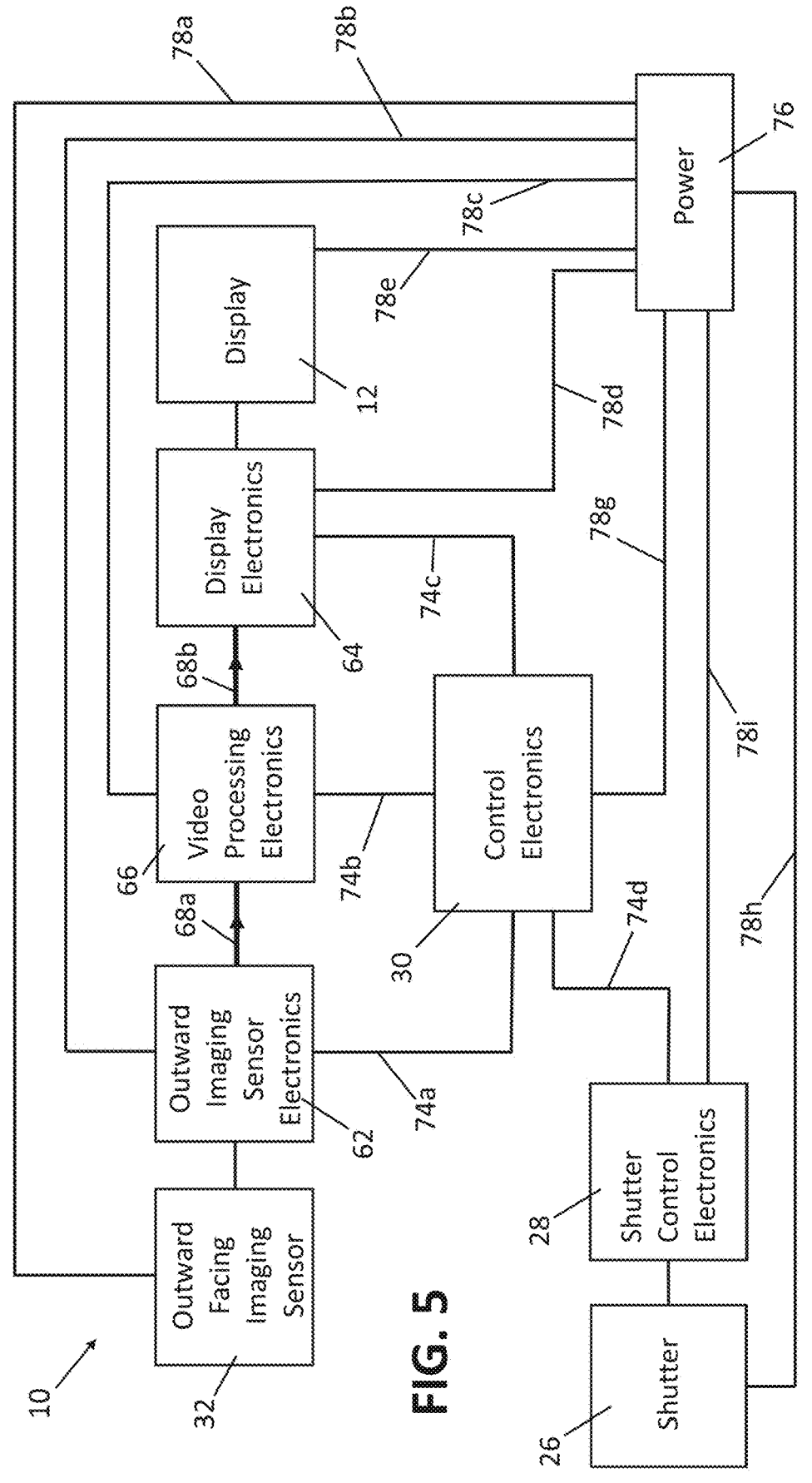
FIG. 5 is a block diagram of a head mounted display system including an outward facing or outward looking imaging sensor (e.g., an outward facing camera comprising optical detector array and imaging optics such as a lens), a display, and a shutter as well as respective connections to a power source.

FIG. 5 shows a block diagram illustrating various electrical components of an augmented reality system 10 such as the head mounted displays 40 shown in FIGS. 1-4. The system 10, for example, includes an outward facing or outward looking imaging sensor, e.g., an outward facing or outward looking camera 32, a display 12, and a shutter 26. The outward facing imaging sensor, e.g., outward facing camera 32 comprises an optical detector array such as a 2D detector array, and outward facing sensor electronics (e.g., detector array electronics 62). Such an optical detector array 32 may comprise a plurality of active pixels (e.g., a 2D array of pixels) sensitive to light such that when light is directed thereon these pixels produce electrical signals (e.g., voltage, current, and/or charge, etc.). These active pixels may comprise, for example, photovoltaic regions or photoconductive regions. The plurality of active pixels may comprise, for example, a plurality of photovoltaic junctions or photodiodes. Example optical detector arrays 32 may include CCD or CMOS detector arrays. As discussed above, other types of imaging sensors, however, are possible. For example, the outward facing imaging sensor may comprise a linear (1D) detector array and an optical scanner. A two-dimensional area of light may be imaged, for example, by collecting light from a smaller linear area (e.g., a strip) extending in a first direction and forming an image thereof on a linear array. The optical scanner may scan across a plurality of such linear areas extending across a second, e.g., orthogonal, direction to image a larger area. In some designs, the outward facing imaging sensor or outward facing camera 32 comprises an event sensor or event camera. The outward facing image sensor electronics 62 may comprise electronics configured to, for example, read and/or control the outward facing imaging sensor (e.g., a 2D optical detector array in an outward facing camera) 32 and are in electrical communication with outward facing imaging sensor (e.g., the optical detector array of the outward facing camera). In some implementations, at least a portion of the detector array electronics 62 may be included on a chip with the optical detector array 32. The detector array electronics 62 may in addition or in the alternative be included in electronics separate from the optical detector array 32 or optical detector array chip. The detector array electronics 62 may, for example, include one or more additional chips, circuitry, boards, etc.

In addition to the display 12, display electronics 64 as well as video processing electronics 66 are shown in the block diagram of FIG. 5. The display electronics 64 may, for example, control the display and/or provide video input thereto. As illustrated, the display electronics 64 are in electrical communication with the display 12. Additionally, in the example system 10 illustrated in FIG. 5, the video processing electronics 66 are in electrical communication with the outward facing imaging sensor electronics (e.g., detector array electronics) 62 and configured to receive video signals (e.g., video images) from the outward facing imaging sensor (e.g., from the detector array electronics 62 which is in electrical communication with the outward facing imaging sensor or optical detector array 32). The video processing electronics 66 is also shown in electrical communication with the display electronics 64 and provides one or more electrical signals to convey image content and possible control data to the display electronics 64 for rendering video images on the display 12. The video processing electronics 66 and/or display electronics 64 may include a graphics driver and/or display driver electronics.

The system 10 shown in FIG. 5 also includes shutter control electronics 28 in electrical communication with the shutter 26. The shutter control electronics 28 may comprise, for example, electronics configured to provide a signal (e.g., a voltage) to the shutter 26 to switch the shutter from one state to another, for example, from open to close and/or from closed to open. As discussed herein, in some implementations when a signal is applied to the shutter 26, the shutter is closed while the shutter is open when no signal is applied. Likewise, when power is lost and/or no power is available to apply a signal to the shutter 26, the shutter may be open in such situations. In other implementations, however, the shutter 26 may be closed when no signal is applied and may be opened by applying a signal. In other implementations, signals may be used to both open and close the shutter 26.

The system 10 illustrated in FIG. 5 also includes control electronics 30 configured to control one or more of the components of the augmented reality system 10. In this example design, the control electronics 30 are shown in communication with the outward facing imaging sensor electronics (e.g., detector array electronics) 62, the display electronics 64 as well as the shutter control electronics 28. Electrical lines 74a, 74b, 74c, 74d are depicted in this example as providing electrical communication between the control electronics 28 and the outward facing imaging sensor electronics (e.g., detector array electronics) 62, the video processing electronics 66, the display electronics 64, and the shutter control electronics 28, however, variations are possible. Such electrical lines 74a, 74b, 74c, 74d may include, for example, one or more conductive pathways such as conductive lines on a printed circuit board, wires, buses, cables, electric leads, pins, connectors, conductive pathways in or on a semiconductor integrated circuit (IC) (e.g., chip)

or any combination thereof. In one or more designs, wireless communication (e.g., BlueTooth®, IOT—Internet of Things, etc.) may be used for electrical communication, for example, between the control electronics 30 and the outward facing imaging sensor electronics (e.g., detector array electronics) 62, the video processing electronics 66, the display electronics 64, the shutter control electronics 28 or any combination of these. In some such designs, wireless, RF, or radio transmitters, receivers, and/or transceivers, which may in some cases be in one or more of the control electronics 30, the outward facing imaging sensor electronics (e.g., detector array electronics) 62, the video processing electronics 66, the display electronics 64, or the shutter control electronics 28, may be used to communicate between devices. Similarly, the control electronics 30 may comprise, for example, one or more processors such as microprocessors and/or microcontrollers, and/or one or more FPGAs and/or other electronics such as one or more other chips or circuits on one or more other boards. Other variations may be included. In various implementations, the control electronics 30 is configured to monitor the operation of the outward facing imaging sensor (e.g. camera) 32 and display 12 as well as possibly power to the various components and may be configured to open the shutter 26 if a problem in capturing images of the environment in front of the user and/or in displaying such captured images is detected.

FIG. 5 further depicts a power supply 76 configured to provide electrical power to various components in the augmented reality system 10. The power supply 76, for example, is shown electrically connected to the outward facing imaging sensor (e.g., optical detector array) 32, the outward facing imaging sensor electronics (e.g., detector array electronics) 62, the video processing electronics 66, the display electronics 64, the display, the shutter 26, the shutter control electronics 28, and the control electronics 30 via electric power lines 78*a*, 78*b*, 78*c*, 78*d*, 78*e*, 78*f*, 78*g*, 78*h*, 78*i*. The power supply 76 may include a battery in some implementations and may include one or more additional electrical components. The electric power lines 78*a*-78*i* may comprise, for example, one or more conductive pathways such as conductive lines on a printed circuit board, wires, buses, cables, electric leads, pins, connectors, conductive pathways in or on a semiconductor integrated circuit (e.g., chip) or any combination thereof. More or less power supplies 76 and/or electrical power lines 78*a*-78*i* may be included in the augmented reality display 10.

In one or more designs, wireless communication (e.g., BlueTooth®, IOT—Internet of Things, etc.) may be used for providing power, for example, to the control electronics 30, the outward facing imaging sensor 32, the outward facing imaging sensor electronics (e.g., detector array electronics) 62, video processing electronics 66, the display electronics 64, the display 12, the shutter 26, the shutter electronics 28 or any combination of these. This power may be from the power supply 76. In some such designs, wireless, RF, or radio transmitters, receivers, and/or transceivers, which may in some cases be in one or more of the power supply 76, the control electronics 30, the outward facing imaging sensor 32, the outward facing imaging sensor electronics (e.g., detector array electronics) 62, video processing electronics 66, the display electronics 64, the display 12, the shutter 26, the shutter electronics 28, or any combination of these may be used to deliver power to devices.

Figure 6:
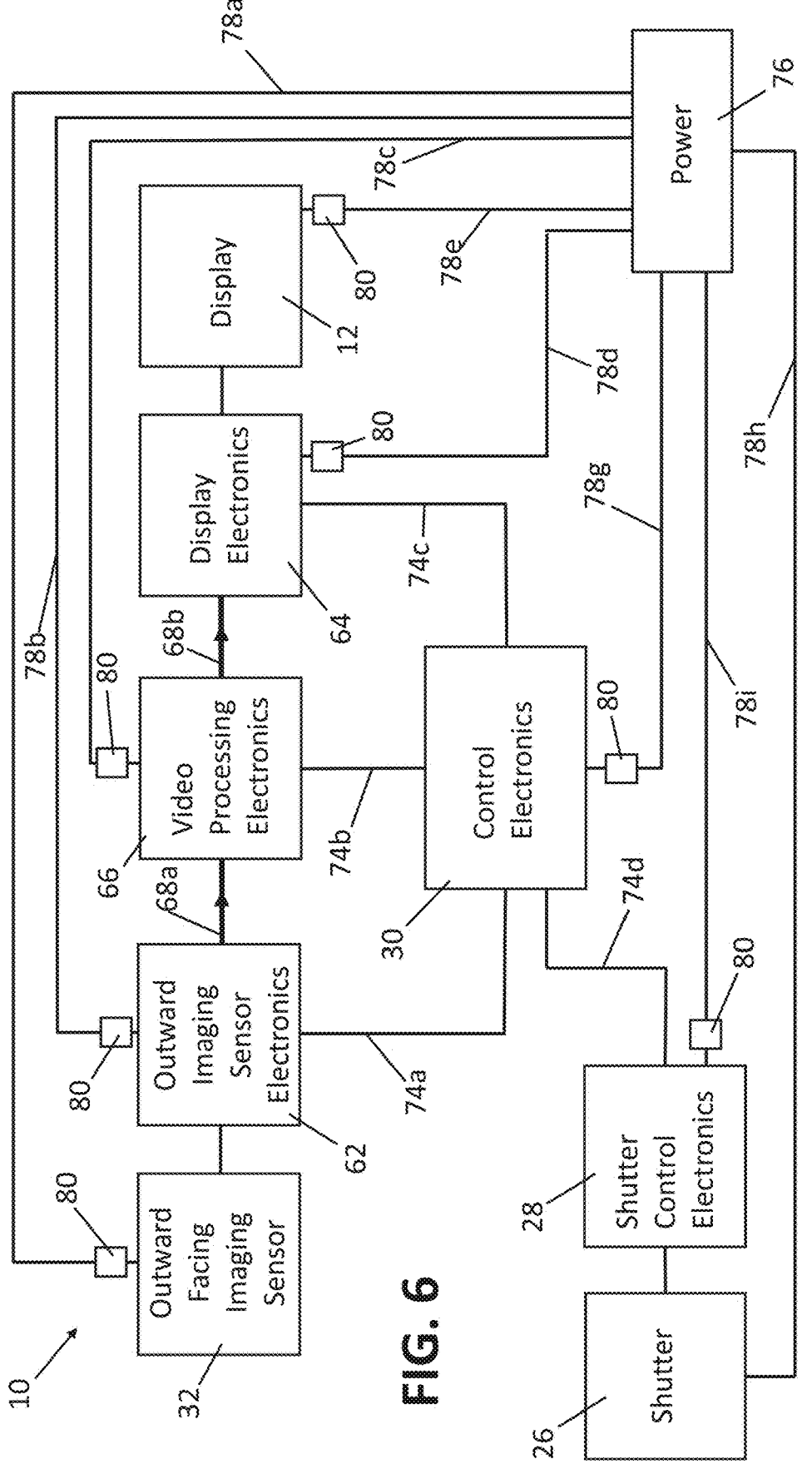
FIG. 6 is a block diagram of a system such as shown in FIG. 5 additionally including circuitry to monitor whether power from the power supply is being supplied to the outward facing sensor, display, shutter, and relevant electronics.

As discussed above, in various implementations, when power is lost, the shutter 26 is opened to permit the user 18 to see forward of the user despite failure of the outward facing imaging sensor (e.g., camera) 32 and/or display 12 to capture and/or display images. According, in some designs, the augmented reality display system 10 includes circuitry 80 configured to monitor the power delivered to various components in the system as illustrated in FIG. 6. FIG. 6, for example, shows a block diagram of an augmented reality system 10 similar to that shown in FIG. 5 further comprising electrical circuitry 80 in electrical communication with the electrical power lines 78*a*-78*i* to the outward facing imaging sensor (e.g., optical detector array) 32, the outward facing imaging sensor electronics (e.g. detector array electronics) 62, the video processing electronics 66, the display electronics 64, the display 12, the shutter 26, the shutter control electronics 28, and the control electronics 30, wherein this circuitry is configured to monitor power to these components. More or less power monitoring circuits 80 may be included. Similarly, more or less power lines 78*a*-78*i* may be monitored. Likewise, in other implementations, the power delivered to one, two, three, four, or more of these components is monitored. For example, in some implementations, the power to the shutter control electronics 28 may not be monitored. Instead, the shutter 26 may be configured to open if no power is applied thereto.

The power monitoring circuits 80 may be in electrical communication with the control electronics 30 via communication lines (not shown for clarity). Such communication lines may comprise, for example, one or more conductive pathways such as conductive lines on a printed circuit board, wires, buses, cables, electric leads, pins, connectors, conductive pathways in or on a semiconductor integrated circuit (e.g., chip) or any combination thereof. In one or more designs, wireless communication (e.g., BlueTooth®, IOT—Internet of Things, etc.) may be used for electrical communication, for example, between one or more of the power monitoring circuits 80 and the control electronics 30. In some such designs, wireless, RF, or radio transmitters, receivers, and/or transceivers, which may in some cases be in one or more of the power monitoring circuits 80 or control electronics 30, may be used to communicate between devices.

The power monitoring circuits 80 may comprise, for example, circuitry configured to signal to the control electronics 30 when no or insufficient power is being delivered. The circuitry 80 may be configured, for example, to signal when the power is below a threshold amount. In some implementations, the power monitoring circuitry 80 may comprise one or more transistors or comparators (e.g., comparator IC) or differential amplifiers (e.g., op amps) configured to output a signal when the power (e.g., a voltage or current or charge) is below a threshold amount. In some designs, power monitoring integrated circuits (ICs) or power management ICs that are configured to monitor power rail brown outs or other conditions and react may be employed. Internally such ICs may include one or more of the circuits discussed above (e.g., a comparator, differential amplifier, etc.) possibly coupled with a controller or processor. Some such ICs or integrated chips comprise full power monitoring subsystems. Other circuits, however, may be employed.

In various implementations, the control electronics 30 may be configured to open the shutter 26 when no or insufficient power is delivered to one or more components such as the outward facing imaging sensor (e.g. camera) 32 and/or display 12. For example, the control electronics 30 may include logic to implement such a fail-safe protocol. The control electronics 30 may comprise, for example, a microprocessor or microcontroller and/or one or more FPGAs or other circuitry that can be programmed to open the shutter 26 by providing an appropriate signal (e.g., high or low, possibly zero voltage, current or charge or a digital signal) to the shutter control electronics 28 when one of the power monitoring circuits indicate to the control electronics of power loss to one of the components. In some configurations, for example, the control electronics 30 provides a signal (e.g., a voltage) to the shutter electronics 28 to open the shutter 26 while in other configurations, the control electronics applies a signal (e.g., voltage) to the shutter electronics when the shutter is to be closed and removes this signal (e.g., voltage) when the shutter is to be open. Other approaches are possible.

Figure 7:
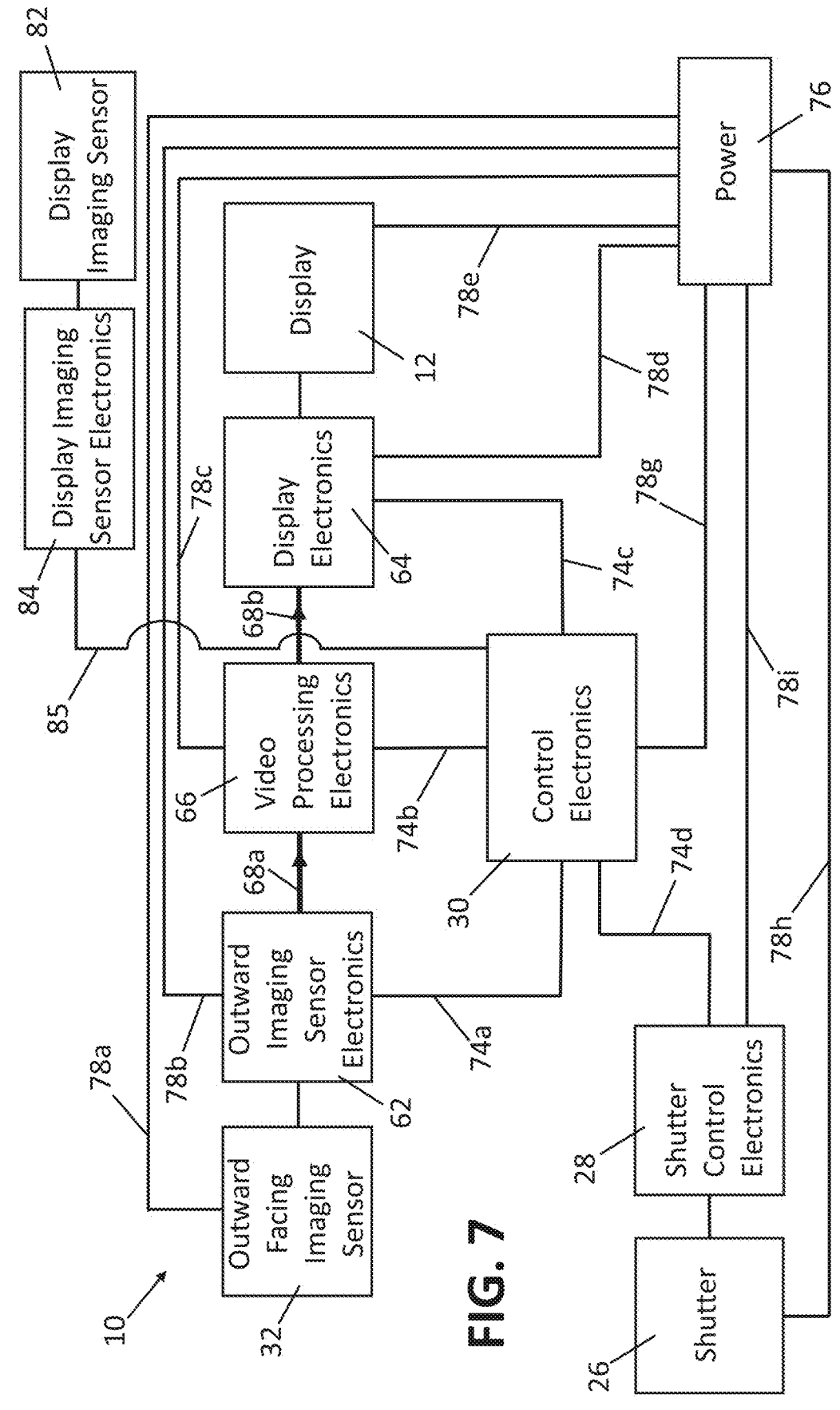
FIG. 7 is a block diagram of a system such as shown in FIG. 5 additionally further comprising a display imaging sensor (e.g., display camera) to capture images of the display to monitor the display for proper operation.

In some designs, the augmented reality system 10 includes a display imaging sensor, e.g., display camera, configured to monitor the display 12 to identify disruption or degradation of video images rendered by the display. FIG. 7, for example, shows a block diagram of an augmented reality system 10 similar to that shown in FIG. 5, further comprising a display imaging sensor, e.g., display camera, 82 and display imaging sensor electronics 84. In some implementations, the display imaging sensor 82 may comprise an optical detector array and imaging optics, e.g., one or more lenses, disposed with respect to the optical detector array to form an image of the display 12 on the optical detector array. The optical detector array in the display imaging sensor, e.g., display camera 82 is thus able to capture images of the display 12 and the video images formed by the display. The optical detector array in the display imaging sensor 82 may comprise a plurality of active pixels sensitive to light such that when light is directed thereon, these pixels produce electrical signals (e.g., voltage, current, and/or charge, etc.). These active pixels may comprise, for example, photovoltaic regions or photoconductive regions such as photodiodes or photoconductors sensitive to light. Example optical detector arrays 82 may include CCD or CMOS detector arrays. Other types of imaging sensors, however, are possible. For example, the display imaging sensor may comprise a linear (1D) detector array and an optical scanner. A two-dimensional area of light may be imaged, for example, by collecting light from a smaller linear area (e.g., a strip) extending in a first direction and forming an image thereof on a linear array. The optical scanner may scan across a plurality of such linear areas extending across a second, e.g., orthogonal, direction to image a larger area. The display imaging sensor electronics 84 may comprise electronics configured to, for example, read and/or control the optical detector array in the display imaging sensor 82 and is in electrical communication with optical detector array. In some implementations, at least a portion of the display imaging sensor electronics (e.g., detector array electronics) 84 may be included on a chip with the optical detector array of the display imaging sensor 82. The display imaging sensor electronics 84 may in addition or in the alternative be included in electronics separate from the optical detector array or optical detector array chip in the display imaging sensor 82. The display imaging sensor electronics 84 may, for example, include one or more additional chips, circuitry, boards, etc.

In the example shown in FIG. 7, the display imaging sensor electronics 84 is shown in electrical communication with the control electronics 30. In particular, an electrical communication line 85 is shown electrically connecting the display imaging sensor 84 and the control electronics 30. This electrical communication line 85 may comprise, for example, one or more conductive pathways such as conductive lines on a printed circuit board, wires, buses, cables, electric leads, pins, connectors, conductive pathways in or on a semiconductor integrated circuit (e.g., chip) or any combination thereof. In some designs, the electrical communication line 85 may convey video images of the display 12 to the control electronics 30 for evaluation. In one or more designs, wireless communication (e.g., BlueTooth®, IOT—Internet of Things, etc.) may be used for electrical communication, for example, between the control electronics 30 and the display imaging sensor electronics 84. In some such designs, wireless, RF, or radio transmitters, receivers, and/or transceivers, which may in some cases be in one or more of the control electronics 30 or display imaging sensor electronics 84, may be used to communicate between devices.

In various implementations, the control electronics 30 may be configured to open the shutter 26 upon disruption of new video images being rendered by the display 12. The control electronics 30 may include logic to implement such a fail-safe protocol. The control electronics 30 may comprise, for example, a microprocessor and/or microcontroller or and/or one or more FPGAs and/or other circuitry that can be programed to open the shutter 26 by providing an appropriate signal (e.g., high or low, possibly zero voltage, current, or charge, or a digital signal) to the shutter control electronics 28 when the images of the display 12 captured by the display imaging sensor, e.g., display camera 82 no longer changes. In some configurations, for example, the control electronics 30 provides a voltage to the shutter electronics 28 to open the shutter 26 while in other configurations, the control electronics applies a voltage to the shutter electronics when the shutter is to be closed and removes this voltage when the shutter is to be open. Other approaches are possible. Images of the display 12 will be expected to change because images rendered by the display will be expected to be regularly updated. The control electronics 30 may therefore be configured to compare images captured at a first time with images captured at a second time (e.g., consecutive images). If the images of the display 12 captured by the display imaging sensor, e.g., display camera 82 are the same, that is, the images may be presumed to be not being updated with new images, then the control electronics 30 can provide an appropriate signal (e.g., high or low, possibly zero voltage, current or charge, or a digital signal) to the shutter control electronics 28 to open the shutter 26. The images compared need not be consecutive images, but may be spaced apart farther in time. In various implementations, however, the first and second times are not greater than 10 seconds apart, 5 seconds apart, 3 seconds apart, 2 seconds apart, 1 second apart, 0.75 seconds apart, 0.5 seconds apart, 0.4 seconds apart, 0.3 seconds apart, 0.25 seconds apart, 0.2 seconds apart, 0.15 seconds apart, 0.1 second apart, 0.08 seconds apart, 0.05 seconds apart, 0.04 seconds apart, 0.03 seconds apart, 0.02 seconds apart, 0.018 seconds apart, 0.016 seconds apart, 0.015 seconds apart, 0.012 second apart, 0.01 seconds apart, 0.008 seconds apart, 0.006 seconds apart, 0.005 seconds apart, 0.004 seconds apart, 0.003 seconds apart, 0.002 seconds apart, 0.001 seconds apart, 0.0008 seconds apart, 0.0005 seconds apart, 0.0002 seconds apart, 0.0001 seconds apart, or any range formed by any of these values or possibly more or less time separates the first and second times. Times outside these ranges are also possible. Likewise, consecutive frames can be compared, or the frames may be separated by 1 frame, 2 frames, 3 frames, 4 frames, 5 frames, 6 frames, 7 frames, 8 frames, 9 frames, 10 frames, 15 frames, 20 frames, 25 frames, 30 frames, 40 frames, 50 frames, 60 frames, 70 frames, 80 frames, 90 frames, 100 frames, 120 frames, 140 frames, 150 frames, 160 frames, 180 frames, 200 frames, 220 frames, 240 frames, 250 frames, 280 frames, 300 frames, or any range formed by any of these values or possible more frames.

In some designs, a feature that changes, for example, may be added to the images to be rendered by the display 12. Likewise, if the change in the image is not detected by the display imaging sensor, e.g., display camera 82, it may be inferred that the display 12 or the outward facing imaging sensor 32 or some other component is not operating correctly and not updating the images. The control electronics 30 may therefore open the shutter 26. Accordingly, in various implementations, the augmented display system 10 may introduce image content to the image that changes on a regular basis, for example, with each frame, with every other frame, with every $3^{rd}$, $4^{th}$, $5^{th}$, $6^{th}$, $7^{th}$, $8^{th}$, $9^{th}$, $10^{th}$, $12^{th}$, $15^{th}$, $20^{th}$, $25^{th}$, $30^{th}$, $35^{th}$, $40^{th}$, $45^{th}$, $50^{th}$, $55^{th}$, $60^{th}$, $65^{th}$, $70^{th}$, $75^{th}$, $80^{th}$, $85^{th}$, $90^{th}$, $95^{th}$, $100^{th}$, $105^{th}$, $110^{th}$, $115^{th}$, $120^{th}$, $125^{th}$, $130^{th}$, $140^{th}$, $150^{th}$, $160^{th}$, $170^{th}$, $180^{th}$, $190^{th}$, $200^{th}$, $210^{th}$, $220^{th}$, $230^{th}$, $240^{th}$, $250^{th}$, $260^{th}$, $270^{th}$, $280^{th}$, $290^{th}$, $300^{th}$, $310^{th}$ frame or any range between any of these values or possibly less frequently. Additionally, the feature need not be introduced necessarily on a regular basis in some implementations. Instead, the duration between frames tested or compared may vary. Nevertheless, even if the separation in time of frames that are compared or monitors varies, such separation can include separations of 0 frames, 1 frame, 2 frames, 3 frames, 4 frames, 5 frames, 6 frames, 7 frames, 8 frames, 9 frames, 10 frames, 15 frames, 20 frames, 25 frames, 30 frames, 40 frames, 50 frames, 60 frames, 70 frames, 80 frames, 90 frames, 100 frames, 120 frames, 140 frames, 150 frames, 160 frames, 180 frames, 200 frames, 220 frames, 240 frames, 250 frames, 280 frames, 300 frames, or any range between any of these values or possibly less frequently.

In some implementations, this feature that changes is introduced by the video processing electronics 66, however, other approaches may be employed. This feature may be introduced with other augmented content in some cases. This feature could be limited to a small portion of the display 12 so as not to interfere with rendering of the view forward of the user 18 captured by the outward facing imaging sensor 32 and/or other augmented display image content or make such view or content more limited or difficult to see. The size of the feature may, for example, be limited to 30 pixels or less, 25 pixels or less, 20 pixels or less, 15 pixels or less, 10 pixels or less, 8 pixels or less, 5 pixels or less, 4 pixels or less, 3 pixels or less, 2 pixels or less, or possible even 1 pixel or any range formed by any of these values or possibly larger. Similarly, the size of the feature may, for example, be limited to 15%, 10%, 8%, 5%, 4%, 3%, 2%, 1%, 0.5%, 0.1%, 0.05%, 0.01%, 0.005%, 0.001%, 0.0005%, or 0.0001%, or 0.00005%, or 0.00001%, or 0.000005%, or 0.000001%, or 0.0000005%, or 0.0000002%, or 0.0000001%, or 0.00000005%, or 0.00000002%, or 0.00000001%, or 0.000000005%, or 0.000000002%, or 0.000000001% of the active area of the display or any range formed by any of these values or possibly larger or smaller. The feature may be a change in the color of a pixel or group of pixels, a change in a symbol (e.g., a letter or number or other symbol) or possibly simply changes in non-descript patterns rendered by a plurality or group of pixels. Colors (e.g., blue versus yellow or other colors) and/or brightness (bright versus dark and/or ranges therebetween) can also be changed and used to ascertain whether a new frame is being rendered. The pixel or plurality or group of pixels may be in the periphery of the frame as opposed to in the center of the frame to increase the likelihood that the feature is not noticed by the user 18 or does not detract from the view (e.g., forward of the user captured by the outward facing imaging sensor 32) or other content presented to the viewer by the display.

To detect the changing features, the control electronics 30 may simply compare images of the display 12 captured by the display imaging sensor, e.g., display camera 82 at different times, the captured images showing different frames rendered at different times by the display. To compare the frames and detect change therebetween, for example, one of the captured frames (e.g., the second captured frame) may be subtracted from the other captured frame (e.g., the first captured frame) and the difference may be evaluated to determine whether change has occurred. If such a comparison manifests a difference in frames (e.g., a difference between the first and second captured frames), it may be assumed that a new frame has been rendered. However, in certain implementations, the control electronics 30 may compare the feature rendered with the pattern that is intended to be displayed. For example, if the feature is a number corresponding to a frame count, the control electronics 30 may compare the number in the frame captured by the display imaging sensor, e.g., display camera 82 with the expected frame count. As discussed above, the feature may comprise symbols (e.g., letters, numbers or other symbols) or a non-descript pattern. Once again, the control electronics 30 may compare the pattern captured by the display imaging sensor, e.g., display camera 82 with the expected pattern. As discussed above, colors (e.g., red versus green or other colors) and/or brightness (dark versus bright and/or ranges therebetween) can also be changed and used to ascertain whether a new frame is being rendered. Accordingly, in addition to detecting a change in images, in various implementations, the control electronics 30 may be used to check whether the feature observed sufficiently matches the feature that was to be rendered. As discussed above, if changes in the images captured by the display imaging sensor, e.g., display camera, 82 are not detected, the shutter 26 may be opened. Similarly, in some implementations, if the feature does not match sufficiently closely to the feature that was to be rendered, the shutter 26 may also be opened.

In various implementations, the display imaging sensor or display camera 82 may comprise an event sensor such as an event camera, which outputs signals as a result of changes detected. The event sensor or event camera may, for example, asynchronously report changes in light, e.g., brightness, detected. In some implementations, the display imaging sensor or display camera 82 comprises a neuromorphic imaging sensor or neuromorphic camera comprising pixels that asynchronously report changes in light, e.g., brightness, detected. The event sensor or camera outputs a signal (e.g., high, low, possibly zero) based on when a change in, for example, the scene in the field of view changes. Signals from event sensor or event camera can be directed to the control electronics. This signal can therefore be monitored to determine if the display 12 is no longer updating with new images possibly indicating that the outward facing imaging sensor 32, the display, or other components in the augmented reality system 10 are malfunctioning. The shutter 26 can then be opened possibly by the control electronics 30, which is programmed to open the shutter if no change or no signal from the event sensor is detected for a time period, T. Other designs that employ other types of sensors and cameras are possible. For example, the control electronics 30 may be configured to open the shutter 26 if a signal is received by the control electronics or if the signal persists for a time period, T. Still other variations are possible.

The display imaging sensor, e.g., display camera 82 may be located proximal to the display 12 to obtain images thereof. The display imaging sensor 82, for example, may be located within 50 mm of the display 12, within 40 mm of the display, within 30 mm of the display, within 20 mm of the display, 10 mm of the display, within 8 mm of the display, within 6 mm of the display, within 5 mm of the display, within 4 mm of the display or any range between any of these values or possibly larger or smaller distances. Likewise, the display imaging sensor (e.g. camera) 82 may have a lens with a focal length of 100 mm, 80 mm, 60 mm, 50 mm, 40 mm, 30 mm, 20 mm, 15 mm, 10 mm, 8 mm, 6 mm, 5 mm, 4 mm, 3 mm, 2 mm, 1 mm or any range between any of these values or possibly larger or smaller. The display imaging sensor 82 may be off to the side, outside and/or in the periphery of the optical path from the display 12 to the beam combiner 20, for example, so as not to obstruct the user's view of the display 12. In some implementations, the display imaging sensor 82 may image the display 12 from off-axis or at an oblique angle. Alternatively, a beamsplitter may be inserted in the optical path between the display 12 and the user's eye 16 (e.g., between the display and the beam combiner 20) to direct a portion of the light from the display to the display imaging sensor 82.

Alternatively, the display imaging sensor, e.g., display camera 82 may be positioned to image the display 12 through the beam combiner 20. Accordingly, the beam combiner 20 may be in the optical path between the display 12 and the display imaging sensor 82. As such, the display imaging sensor 82 may receive light from the display 12 that is transmitted through or reflected by the beam combiner 20 to form images of the display. Likewise, in some implementations, the display imaging sensor 82 may be located proximal to the beam combiner 20 and/or between the beam combiner and the user's eye 16 to obtain images of the display 12. The display imaging sensor 82 may, for example, be located within 50 mm of the beam combiner 20, within 40 mm of the beam combiner, within 30 mm of the beam combiner, within 20 mm of the beam combiner, within 15 mm of the beam combiner, within 10 mm of the beam combiner, within 8 mm of the beam combiner, within 6 mm of the beam combiner, within 5 mm of the beam combiner, within 4 mm of the beam combiner or any range between any of these values or possibly larger or smaller distances. The display imaging sensor (e.g. camera) 82, however, may have a focal length of sufficient size to image the display 12, for example, through the beam combiner 20. Likewise, the display imaging sensor (e.g. camera) 82 may have a lens with a focal length of 100 mm, 90 mm, 80 mm, 70 mm, 60 mm, 55 mm, 50 mm, 45 mm, 40 mm, 35 mm, 30 mm, 25 mm, 20 mm, 15 mm, 10 mm, 9 mm, 8 mm, 7 mm, 6 mm, 5 mm, 4 mm, 3 mm, 2 mm, 1 mm, or any range between any of these values or possibly larger or smaller. Similarly, the length of the optical path from the display 12 to the display imaging sensor (e.g. camera) 82 may be 80 mm or less, 70 mm or less, 60 mm or less, 55 mm or less, 50 mm or less, 45 mm or less, 40 mm or less, 35 mm or less, 30 mm or less, 25 mm or less, 20 mm or less, 15 mm or less, 10 mm, 9 mm, 8 mm, 7 mm, 6 mm, 5 mm, 4 mm, 3 mm, 2 mm, 1 mm, or less, or any range between any of these values or possibly larger or smaller. The display imaging sensor (e.g. camera) 82 may be off to the side, outside and/or in the periphery of the optical path from the beam combiner 20 to the eye 16 so as not to obstruct the user's view of the display 12. In some implementations, the display imaging sensor 82 may image the display 12 from off-axis or at an oblique angle with respect to the beam combiner 20 and/or the optical path from the beam combiner to the eye 16 and/or from the display to the beam combiner to the eye. Alternatively, a beam splitter may be inserted in the optical path, e.g., between the beam combiner 20 and the user's eye 16 to direct a portion of the light from the beam combiner (e.g., from the display 12) to the display imaging sensor 82.

As discussed above, the assumption is that the video images change; new images are displayed as the outward facing imaging sensor 32 renders a new video frame. Likewise, if the images obtained by the display imaging sensor 82 do not show a change between the image captured at a first time and the image captured at the second time, then the display 12 or the outward facing imaging sensor 32 or some other component may not be operating correctly and the control electronics 30 may open the shutter 26. In some implementations, however, if a change is not detected over multiple comparisons between frames, the control electronics 30 may open the shutter 26. The control electronics may be configured to open the shutter 26 if change is not detected on 2 comparisons, 3 comparison, 4 comparisons, 5 comparisons, 6 comparisons, 8 comparisons, 10 comparisons, 12 comparisons, 15 comparisons, 16 comparisons, 18 comparisons, 20 comparisons, 25 comparisons, 30 comparisons, or any range between any of these values or possibly larger or smaller numbers of comparisons. In some implementations, the head mounted display may further comprise a motion sensor and the controller may be configured to receive signals from the motion sensor to assist in identifying whether the head mounted display is not operating correctly. For example, if a change is not detected over a plurality of frames and movement of the head has been detected, for example, by a motion sensor such as an inertial measurement unit (IMU) or head tracker, then the controller could be configured to open the shutter. The scene should have changed at least due to the movement of the head and if change in the scene is not detected the camera or outward facing sensor or other component of the head mounted display may not be functioning properly. In some implementations, the head mounted display may further comprise a proximity sensor, and the controller may be configured to receive signals from the proximity sensor (e.g., which may be configured to output a signal based on the proximity to the user) to assist in identifying whether the head mounted display is not operating correctly. For example, if a change is not detected over a plurality of frames and a proximity sensor that measures distance to the user indicates that the head mounted display is on the person, for example, then the controller could be configured to open the shutter. Conversely, if the proximity sensor indicates that the head mounted display is removed from the user such as on a table or shelf or in a drawer, the controller would not need to open the shutter.

The images captured by the display imaging sensor, e.g., display camera, 82 can in addition or in the alternative be evaluated to detect degradation. The control electronics may, for example, be programmed and/or otherwise configured to detect such degradation and to cause the shutter 26 to be open in response to such degradation being detected. Possible forms of image degradation that may be detected may include reduced spatial resolution, one or more dead sections of the image caused potentially by one or more dead sections of the display 12 (e.g., one or more pixels of the display) and/or one or more dead section of the outward facing imaging sensor or camera 12 (e.g., one or more pixels of the optical detector array 32), partially filled display wherein the images is reduced or squeezed in size and only covers a portion of the display, blotches, circle or circular defects, ghosting or any combination of these. In some cases, the degradation may be temporally varying such as temporally varying noise, time varying noise). In other cases, the image may exhibit a spatial defect that does not change temporally. Examples of such spatial defects include dead zones, spatial noise such as pixels that do not display the image and are either dark or simply do not coincide with the bulk of the image displayed or possibly the image has otherwise gone black. In some cases, these pixels are randomly located and/or have different colors. In some cases, the images stop updating and a ghost image remains. This ghost image may persist or may fade, e.g., to a blank screen such as a black screen or possibly to random spots. Defects that vary in other ways, such as temporally, spatially, and/or otherwise are possible. Likewise, other forms of defects in the image captured and/or displayed may be detected.

These defects may be caused by problems with the display 12, the display electronics 64, the outward facing imaging sensor 32 or associated electronics 62, the video driver or video processing electronics 66, other components or any combination thereof. Other causes are possible.

Defects and/or degradation can be detected in various ways, which can potentially be combined. In some implementations, for example, frames are stored and compared to detect the emergence of a defect. In some implementations, artificial intelligence and/or machine learning may be employed to detect defects and/or degradation. Object detection or other forms of artificial intelligence-based image analysis, and combinations thereof may be employed. For example, object detection may detect dead zones or random pixels that do not coincide with the image (e.g., static noise comprising pixels of random and/or different color).

As discussed above, a display imaging sensor 82 that images the display 12, e.g., possibly a substantial portion of the display, most of the display, or the entire display, may be employed to detect many of these defects. In various implementations, artificial intelligence may be employed to detect such defects. The head mounted display may, for example, be trained to detect one or more defects. In some cases, only a portion of the display 12 or image or image field, or only number of pixels (e.g., less than 95%, less than 90%, less than 80%, less than 75%, less than 60%, less than 50%, less than 25%, less than 10%, less than 5%, less than 2%, less than 1%, or any range formed by any of these values) are monitored. Some of these defects may not change from frame to frame. In some implementations, noise can be detected by a high pass filter, or possibly a flicker detector.

Figure 8:
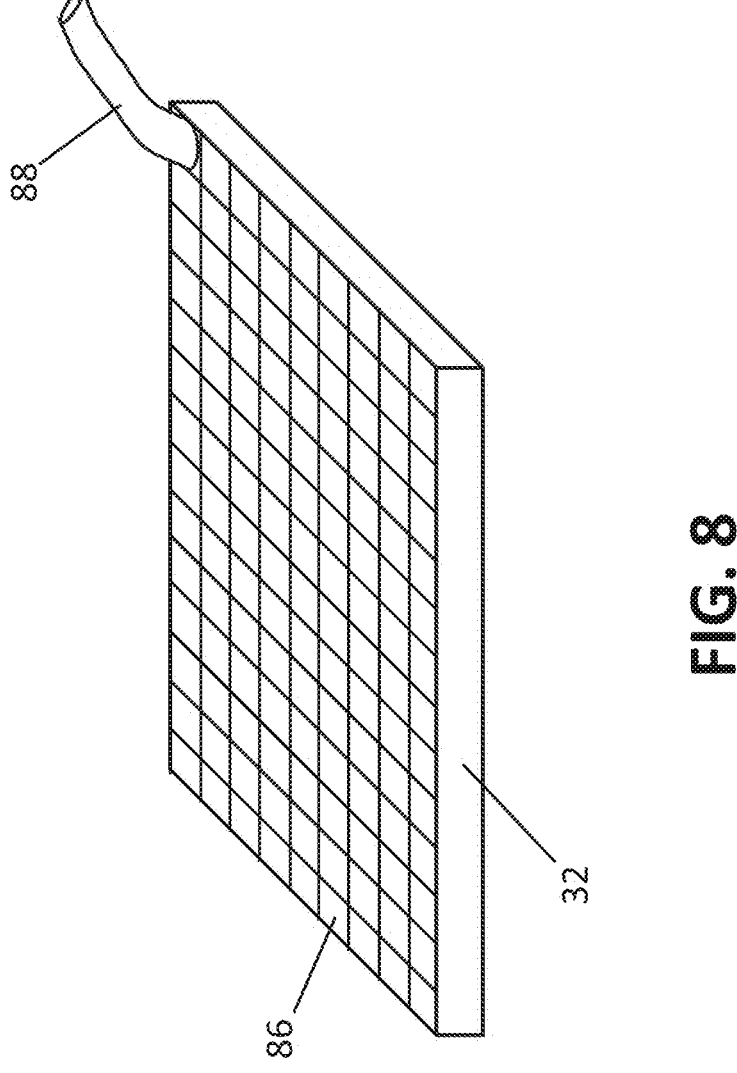
FIG. 8 illustrates is a schematic drawing of optical fiber configured to provide a modulated signal to an optical detector array of the outward facing imaging sensor such that the outward facing imaging sensor captures images that change and failure of the display to update the image can be readily detected.

As discussed above, a feature could be added to the image displayed by the display 12 and this feature could be monitored to assess whether the display is rendering new frames, e.g., updating frames. In some implementations, a signal can be directed to at least a portion of the outward facing imaging sensor 32 to introduce a feature in the image displayed by the display 12. Such an approach can be used to monitor the operation of the outward facing imaging sensor 32 as well as the display 12. FIG. 8 shows an example design configured to direct a modulated signal to a portion of the optical detector array 32 of the outward facing imaging sensor 32. In this example, a distal end of an optical fiber 88 is disposed with respect to a pixel 86 of the optical detector array 32 to provide light to the pixel. The optical fiber 88 may be optically coupled (e.g., at the proximal end thereof) to a light source such as an LED. This light may be modulated, for example, by modulating the light source. For example, the light may change intensity for different frames captured by the optical detector array 32 of the outward facing imaging sensor 32. The display 12 can be monitored as discussed above, for example, by a display imaging sensor, e.g., display camera 82, to determine whether the frames rendered by the display change in a manner consistent with the modulated signal provided to the optical detector array 32 of the outward facing imaging sensor 32 via the optical fiber 88. If the images captured by the display imaging sensor 82 of the display 12 and the images rendered by the display do not manifest a change despite modulated light being coupled to the outward facing imaging sensor 32, the control electronics 30 may open the shutter 26. Similarly, if the images captured by the display imaging sensor 82 of the display 12 and the images rendered by the display do not manifest a change consistent with the modulation of the light applied to the pixel 86 via the optical fiber 88, the control electronics 30 may open the shutter 26.

FIG. 8 schematically illustrates a single fiber 88 optically coupled to a single pixel 86. Other arrangements, however, are possible. For example, more than a single pixel 86 may be illuminated with light. For instance, the optical fiber 88 may be larger and be optically coupled to a plurality of pixels 86. A plurality of optical fibers 88 or a fiber bundle may be optically coupled to a plurality of pixels 86. In designs where more than one pixel 86 is illuminated with light, a pattern may be provided to the optical detector array 32 of the outward facing imaging sensor 32 for displaying by the display 12. For example, a plurality of light sources may be optical coupled to a plurality of pixels 86 via a plurality of respective optical fibers 88. The different light sources (e.g., of same or different colors and/or brightness) may be modulated in a manner to provide for a pattern of light to be directed to the plurality of pixels 86. Other approaches to forming a pattern are also possible. For example, a projector may be employed to project an image onto a portion of the optical detector array 32, e.g., to a plurality of pixels 86. As discussed above, the pattern may comprise, for example, a symbol (e.g., letter, number, character) as well as a non-descript pattern. Different colors and/or intensities may also be used to form the pattern. Also as discussed above, the display imaging sensor 12 may capture images that include the pattern formed on the pixels 86 of the optical detector array 32 and the control electronics 30 can use the pattern to determine whether the outward facing imaging sensor 32 and/or the display 12 and/or other components are operating correctly.

Instead of employing a display imaging sensor 82 to image the display 12 and capture images of the output of the display, a light sensor can detect light from the display without forming an image of the display. The light sensor, for example, can be mounted directly onto one or more pixels of the display 12 or one or more lenses, optical fibers or light guides can be mounted directly on or with respect to the display to couple light from one or more pixels of the display to the light sensor.

Figure 9:
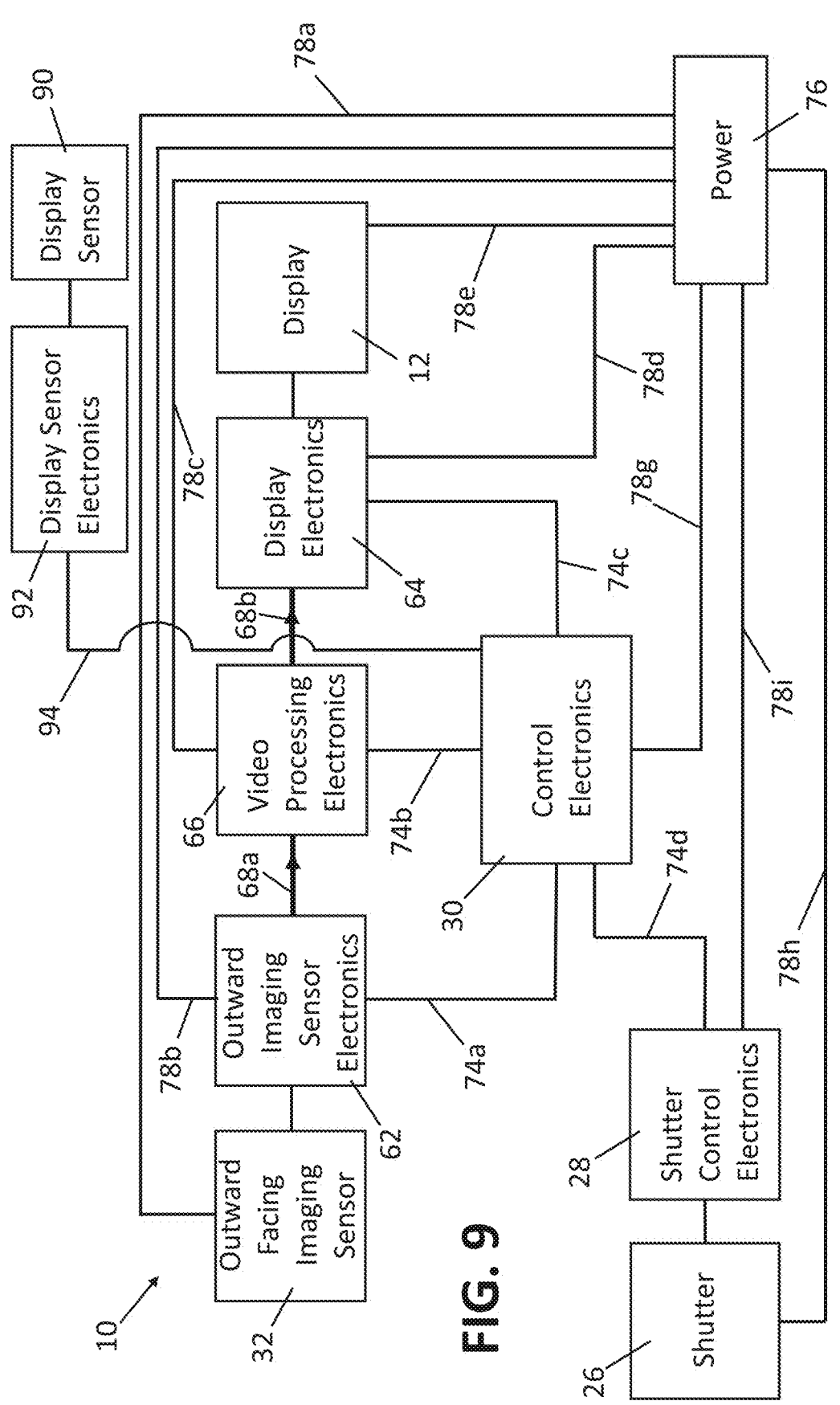
FIG. 9 is a block diagram of a system such as shown in FIG. 5 further comprising an optical sensor (e.g. a photodiode) referred to as a display sensor to sense light from the display to monitor the display for proper operation (e.g., to detect that the display is updating the images).

FIG. 9 schematically illustrates an augmented reality system 10 similar to that shown in FIG. 5 further comprising such a display sensor 90 comprising a light sensor configured to monitor light output by a portion of the display 12. The display sensor 90 may comprise a light sensor that is configured to output an electrical signal (e.g., voltage, current, and/or charge, etc.) when light is directed thereon or thereto. Example light sensors include photovoltaic detectors (e.g., photodiodes) and photoconductors. The augmented reality system may optionally further comprise display sensor electronics 92, which may comprise electronics configured to, for example, bias (e.g., apply a voltage, current or charge to) the light sensor, control and/or receive the electrical signals from the display sensor 90. Likewise, the display sensor electronics 92 is shown in electrical communication with the display sensor 90. In some implementations, at least a portion of the display sensor electronics 92 is included on a chip or IC with the display sensor 90. The display sensor electronics 92 may in addition or in the alternative be included in electronics separate from the display sensor 90. The display sensor electronics 92 may, for example, include one or more electrical components and/or circuits on a same or different board (PCB) or carrier as the display sensor 90.

In the example shown in FIG. 9, the display sensor electronics 92 is in electrical communication with the control electronics 30. In particular, an electrical communication line 94 is shown electrically connecting the display sensor electronics 92 and the control electronics 30. This electrical communication line 94 may comprise, for example, one or more conductive pathways such as conductive lines on a printed circuit board, wires, buses, cables, electric leads, pins, connectors, conductive pathways in or on a semiconductor integrated circuit (e.g., chip) or any combination thereof. In one or more designs, wireless communication (e.g., BlueTooth®, IOT—Internet of Things, etc.) may be used for electrical communication, for example, between the control electronics 30 and the display sensor electronics 92. In some such designs, wireless, RF, or radio transmitters, receivers, and/or transceivers, which may in some cases be in one or more of the control electronics 30 or display sensor electronics 92, may be used to communicate between devices. In some designs, the electrical communication line 94 may convey electrical signals from the display sensor electronics 92 to the control electronics 30 for evaluation. In other designs, the electrical communication line 94 may convey an electrical signal from the display sensor 90 to the control electronics 30 without passing through the display sensor electronics 92. Other configurations are possible.

As discussed above, in various implementations, the control electronics 30 may be configured to open the shutter 26 upon disruption of new video images being rendered by the display 12. Accordingly, the display sensor 90 may monitor changes in the output of a portion of the display 12 from which the display sensor is optically coupled and/or configured to receive light. The control electronics 30 may include logic to implement a fail-safe protocol when no change in light directed onto the display sensor 90 is detected. The control electronics 30 may comprise, for example, a microprocessor and/or microcontroller and/or one or more FPGAs and/or other circuitry that can be programmed to open the shutter 26 by providing an appropriate signal (e.g., high or low, possibly zero voltage, current or charge or a digital signal) to the shutter control electronics 28 when the display sensor does not detect a change in light intensity or does not detect a change in light intensity over a period of time, T, or more. In some configurations, for example, the control electronics 30 provides a voltage to the shutter electronics 28 to open the shutter 26 while in other configurations, the control electronics applies a voltage to the shutter electronics when the shutter is to be closed and removes this voltage when the shutter is to be open. Other approaches are possible. Light incident on the display sensor 12 may change as images rendered by the display are updated. However, as discussed above, in some designs, a feature that changes may be added to the images to be rendered by the display 12. This feature may be located on the display pixel or pixels from which the display sensor 90 receives light. Likewise, if the change in the image is not detected by the display sensor 90, it may be inferred that the display 12 is not operating correctly and not updating the images and the shutter 26 may be opened by the control electronics 30.

The control electronics 30 may therefore be configured to compare an output by the display sensor 90 at a first time with a signal output by the display sensor at a second time (e.g., consecutive images). If the display sensor 90 output is unchanged (e.g., same or within a range of each other), the display 12 may be presumed to not to be updating the images with new images, then the control electronics 30 can open the shutter 26. The output from the display sensor 90 that are compared need not be from consecutive images or frames, but may be spaced apart farther in time. In various implementations, however, the first and second time are not greater than 10 seconds apart, 5 seconds apart, 3 seconds apart, 2 seconds apart, 1 second apart, 0.75 seconds apart, 0.5 seconds apart, 0.4 seconds apart, 0.3 seconds apart, 0.25 seconds apart, 0.2 seconds apart, 0.15 seconds apart, 0.1 second apart, 0.08 seconds apart, 0.05 seconds apart, 0.04 seconds apart, 0.03 seconds apart, 0.02 seconds apart, 0.018 seconds apart, 0.016 seconds apart, 0.015 seconds apart, 0.012 second apart, 0.01 seconds apart, 0.008 seconds apart, 0.006 seconds apart, 0.005 seconds apart, 0.004 seconds apart, 0.003 seconds apart, 0.002 seconds apart, 0.001 seconds apart, 0.0008 seconds apart, 0.0005 seconds apart, 0.0002 seconds apart, 0.0001 seconds apart, or any range formed by any of these values or possibly more or less time. Times outside these ranges are also possible. Likewise, signals from consecutive frames can be compared, or the frames may be separated by 1 frame, 2 frames, 3 frames, 4 frames, 5 frames, 6 frames, 7 frames, 8 frames, 9 frames, 10 frames, 15 frames, 20 frames, 25 frames, 30 frames, 40 frames, 50 frames, 60 frames, 70 frames, 80 frames, 90 frames, 100 frames, 120 frames, 140 frames, 150 frames, 160 frames, 180 frames, 200 frames, 220 frames, 240 frames, 250 frames, 280 frames, 300 frames, or any range formed by any of these values or possible more frames.

In some implementations, circuitry monitors the signals (e.g., voltage, current or charge) from the sensor 90. If the signal is a voltage, the circuitry may comprise an analog to digital converter to sample the voltage and output a digital signal, which may be provided to a microcontroller or microprocessor and/or one or more FPGAs and/or other circuitry in some designs for evaluation, for example, to monitor for changes or lack thereof as describe above. If the signal output from the display sensor 90 is a current, the current may be converted to a voltage using one or more resistors. In some designs, at least one resistor is electrically coupled to an input node of an op amp such that the current is transformed into a voltage at the input of the op amp and a voltage signal is output from the op am. The output of the op amp may, in some designs, be electrically coupled to an ADC, which samples the voltage and outputs a digital signal. The current is thus converted into a digital signal for monitoring. In some implementations, this digital signal is provided to the microcontroller or microprocessor and/or one or more FPGAs and/or other circuitry, which monitors the current for changes or lack thereof, etc. Accordingly, in various designs, regardless of whether the signal is a voltage, a current or charge, the signal may be digitized at some point, e.g., by a controller, ADC or other circuit. An example of another circuit may be a comparator, for example, that has some set trigger. The comparator may output a digital signal that is indicative of the state of the system, e.g., functioning or malfunctioning.

Figure 10:
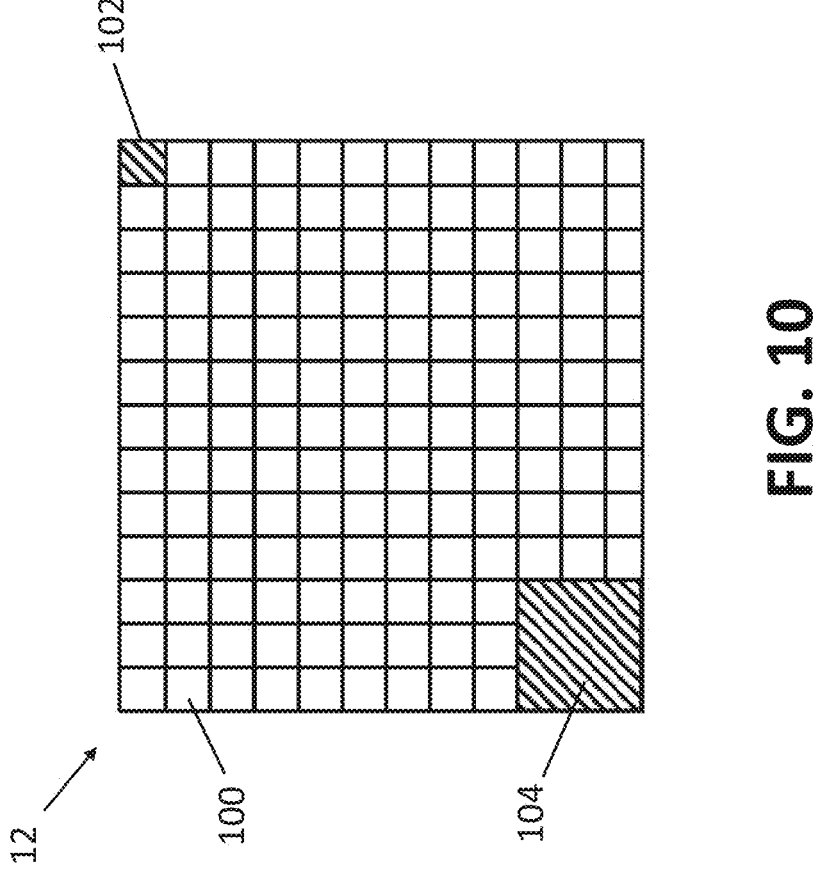
FIG. 10 is a schematic drawing of a display showing small sections of the display that are monitored by the display sensor or optical sensor to determine whether the display is properly operating.

As discussed above, in various designs, the light sensor 90 can be mounted directly onto one or more pixels of the display or one or more optical fibers or light guides can be mounted directly on the display to couple light from one or more pixels of the display to the light sensor 90. Or possibly one or more lenses, potentially spaced apart from the display 12, may couple light from a portion of the display, e.g., one or a plurality of pixels of the display. FIG. 10, for example, shows a display 12 comprising a plurality of pixels 100 for rendering an image. In various implementations, one 102 of the pixels 100 may be optically coupled to a light sensor to provide a display sensor 90 for monitoring the light output by said pixel of the display 12. The light sensor 90 may be placed in front of, on or over this pixel 102 or otherwise positioned to collect light from this pixel. Alternatively, the light sensor 90 may be optically coupled to the pixel 102 using a lens, optical fiber, or optical fiber bundle. In various implementations, this light sensor 90 is optical coupled to this pixel 102 in a manner to reduce cross-talk from other pixels such as adjacent or nearby pixels from directing light therefrom into the light sensor. In some implementations, the light sensor 90 is configured to collect light from a plurality of contiguous pixels 104 such as shown in FIG. 10. Once again, the light sensor 90 may be placed in front of, on or over the group of pixels 104 or otherwise positioned to collect light from these pixels. Alternatively, the light sensor 90 may be optically coupled to the plurality of pixels 104 using one or more lenses, optical fibers, or optical fiber bundles. As discussed above, in various implementations, this light sensor 90 is optical coupled to the plurality of pixel 104 in a manner to reduce cross-talk from other pixels such as adjacent or nearby pixel from directing light therefrom into the light sensor. In the example shown in FIG. 10, nine pixels 104 are identified as being optically coupled to a light sensor 90 to direct light thereto, however, the light sensor may be configured to receive light from more or less pixels to monitor the display 12. As illustrated, in various implementations, the pixels 100, 104 to which the light sensor 90 is optically coupled and receives light are located on the periphery of the display 12. Being in the periphery of the display 12 may be more desirable than being centrally located which may introduce a centrally located obstruction into the field of view of the user viewing the display. A peripherally located obstruction may be less distracting.

As discussed above, the light sensor or sensors (e.g. family of sensors) 90 or one or more optical fibers, waveguides or lenses may extend over more than a single pixel. More than one light sensor 90 such a quad sensor or linear detector array may be employed. For example, a linear light sensor or detector array 90 may extend across a row or column of the display 12 or a portion of a row or column, for example, over multiple pixels or over a cluster (e.g., contiguous group) of pixels. In some implementations, a plurality of light sensors 90 located in separate locations, for example, at or proximal to the corners (e.g., the four corners) or at or proximal opposite sides of the display 12 may be used. Similarly, a plurality of optical fibers, waveguides or lenses may extend across a row or column of the display or a portion of a row or column, for example, over multiple pixels or over a cluster (e.g., contiguous group) of pixels. In some implementations, a plurality of optical fibers, waveguides or lenses located in separate locations, for example, at or proximal to the corners (e.g., the four corners) or at or proximal to opposite sides of the display 12 may be used. In some implementations, lights sensors 90, fiber, waveguides, or lenses may extend over a plurality of pixels some of which may be grouped together while others may be separated (e.g., one or more corners of the display 12, or opposite sides of the display). Also, any combination lights sensors 90, fiber, waveguides, or lenses may be employed.

Figure 11:
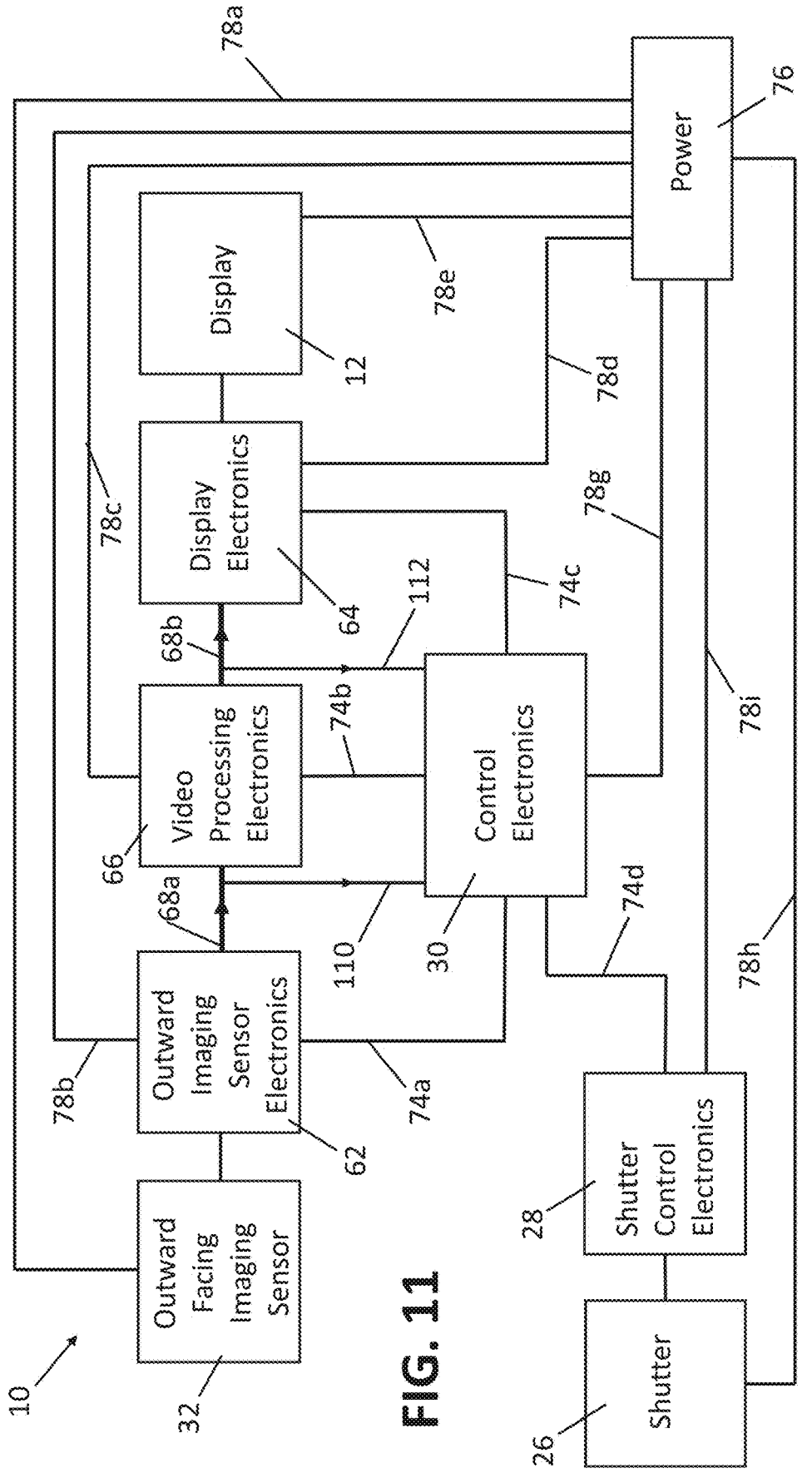
FIG. 11 is a block diagram of a system such as shown in FIG. 5 additionally configured to tap off video signal to the display to monitor for proper operation of the outward facing or outward looking imaging sensor.

FIG. 11 illustrates another approach to monitoring the operation of the augmented reality system 10. FIG. 11 shows a block diagram of an augmented reality system 10 similar to that shown in FIG. 5 further comprising electrical lines 110, 112 configured to tap off the video signal to the display 12 to monitor for proper operation of the outward facing imaging sensor 32. In particular, FIG. 11 shows a first video communication line 68a electrically connecting the outward facing imaging sensor electronics, e.g., detector array electronics, 62 to the video processing electronics 66. Similarly, a second video communication line 68b is shown electrically connecting the video processing electronics 66 to the display electronics 64. The first and second video communications lines 68a facilitate the transfer of video produced by the outward facing imaging sensor 32 to be transferred to the display 12 for display. The video processing electronics 66 may augment and/or adjust (e.g., modify) the video signal generated by the outward facing imaging sensor 32 that is rendered by the display 12. The video processing electronics or video processor 66 can be configured to add the augmented reality content to the video signal such that the augmented reality content appears on the display 12. Other designs are possible, however. For example, in some designs, the display electronics 64 can be configured to add the augmented reality content to the image that appears on the display 12. The display electronics 64 may, for example, be configured to perform a screen overlay directly in the display electronics 64. Other designs or configurations are possible. FIG. 11 also shows the outward facing imaging sensor electronics, e.g., detector array electronics, 62 in electrical communication with the control electronics 30 via the first video communication line 68a and the electrical line 110 electrically connected to the first communication line 68a. Similarly, FIG. 11 also shows the video processing electronics 66 in electrical communication with the control electronics 30 via the second communication line 68b and the electrical line 112 electrically connected to the second video communication line 68b.

The first and second communication lines 68a, 68b and the electrical lines 110, 112 may comprise, for example, one or more conductive pathways such as conductive lines on a printed circuit board, wires, buses, cables, electric leads, pins, connectors, conductive pathways in or on a semiconductor integrated circuit (e.g., chip) or any combination thereof. In some designs, the first video communication line 68a and the electrical line 110 may convey video signals from the outward facing imaging sensor electronics, e.g., detector array electronics 62 to the control electronics 30 for evaluation. In other designs, the electrical line 110 may be directly connected to the outward facing imaging sensor electronics, e.g., detector array electronics, 62 to convey an electrical signal from the outward facing imaging sensor electronics or detector array electronics 62 to the control electronics 30 without passing through the first video communication line 68a electrically. Likewise, in some designs, the second video communication line 68b and the electrical line 112 may convey video signals from the video processing electronics 66 to the control electronics 30 for evaluation. In other designs, the electrical line 112 may be directly connected to the video processing electronics 66 to convey an electrical signal from the video processing electronics to the control electronics 30 without passing through the second video communication line 68b. Also, in different implementations, either electrical line 110, 112 or both may be present and convey video signals from outward facing imaging sensor electronics, e.g., detector array electronics, 62 and/or video processing electronics 66 to the control electronics 30. Other configurations are possible.

In one or more designs, wireless communication (e.g., BlueTooth®, IOT—Internet of Things, etc.) may be used for electrical communication, for example, between the control electronics 30 and the outward facing imaging sensor electronics (e.g., detector array electronics) 62, the video processing electronics 66 and the display electronics 64, the video processing electronics and the control electronics, the outward facing imaging sensor electronics (e.g., detector array electronics) and the video processing electronics or any combination of these components. In some such designs, wireless, RF, or radio transmitters, receivers, and/or transceivers, which may in some cases be in one or more of the control electronics 30, the outward facing imaging sensor electronics (e.g., detector array electronics) 62, the video processing electronics 66, or the display electronics 64, may be used to communicate between devices.

As discussed above, in various implementations, the control electronics 30 may be configured to open the shutter 26 upon disruption of new video images being rendered by the display 12. Accordingly, control electronics 30 may monitor the video signal being transmitted either or both from the outward facing imaging sensor, e.g., detector array electronics, 62 to the video processing electronics 66 and/or from the video processing electronics to the display electronics 64. As discussed above, the control electronics 30 may include logic to implement a fail-safe protocol when the video signal manifests (i) a disruption in providing images or updating images and/or (ii) degradation in the image. The control electronics 30 may digitally monitor the video signal. The control electronics 30 may comprise, for example, a microcontroller or microprocessor and/or one or more FPGAs and/or other circuitry that can be configured and/or programmed to detect that the video signal has terminated or is too weak or has ceased updating frames or that the images have defects such as described above. Such defects or degradation may include, for example, reduced spatial resolution, one or more dead sections of the image caused potentially by one or more dead sections of the display 12 (e.g., one or more pixels of the display) and/or one or more dead section of the outward facing imaging sensor or camera 12 (e.g., one or more pixels of the optical detector array 32), a partially filled display wherein the images are reduced or squeezed in size and only cover a portion of the display, blotches, circle or circular defects, ghosting or any combination of these. In some cases, the degradation may be temporally varying such as temporally varying noise (e.g., time vary noise). In other cases, the image may exhibit a spatial defect that does not change temporally. Examples of such spatial defects include dead zones, spatial noise such as pixels that do not display the image and are either dark or simply do not coincide with the bulk of the image displayed or possibly the image has otherwise gone black. In some cases, these pixels are randomly located and/or have different colors. In some cases, the images stop updating and a ghost image remains. This ghost image may persist or may fade, e.g., to a blank screen such as a black screen or possibly to random spots. Other variations in defects, temporal, spatial, and/or otherwise, are possible. Likewise, other forms of defects in the image captured and/or displayed may be detected.

As discussed above, defects and/or degradation can be detected in various ways, which can potentially be combined. In some implementations, for example, frames are stored and compared to detect the emergence of a defect. In some implementations, artificial intelligence and/or machine learning may be employed to detect defects and/or degradation. Object detection or other forms of artificial intelligence-based image analysis, and combinations thereof, may be employed. For example, object detection may detect dead zones or random pixels that do not coincide with the image (e.g., static noise comprising pixels of random and/or different color).

As discussed above, in various implementations, artificial intelligence may be employed to detect such defects. The head mounted display (e.g., control electronics 30) may, for example, be trained to detect one or more defects. In some cases, only a portion of the image or image field or only number of pixels (e.g., less than 95%, less than 90%, less than 80%, less than 75%, less than 60%, less than 50%, less than 25%, less than 10%, less than 5%, less than 2%, less than 1%, or any range formed by any of these values) are monitored. In some cases, these defects may not change from frame to frame. In some implementations, noise can be detected by a high pass filter, or possibly a flicker detector.

The control electronics 30, which is in electrical communication with the shutter electronics 28, may be programmed to open the shutter 26 when such disruption and/or degradation is detected. Disruption for over a period of time, T, or more may trigger the shutter 26 to be opened.

As expected, the video signal may change as images rendered by the display are updated. However, as discussed above, in some designs, the augmented reality system 10 may be configured to direct light that changes in intensity (e.g., modulated light) to a portion of the outward facing imaging sensor or camera 32 to cause the video signal to change. Once again, FIG. 8 shows an example design configured to direct a modulated signal to a portion of the optical detector array 32 of the outward facing imaging sensor 32 using an optical fiber 88. In this example, a distal end of the optical fiber 88 is disposed with respect to a pixel 86 or a plurality of pixels to provide light to the pixel or pixels. Other configurations are possible. Likewise, if the change in the image, for example, introduced by the modulated light direct to the outward facing imaging sensor 32 by the optical fiber 88 is not detected in the video signal, it may be inferred that the outward facing imaging sensor, e.g., optical detector array, outward facing imaging electronics, e.g., detector array electronics, 62, or video processing electronics, are not operating correctly and not updating the images and the shutter 26 may be opened by the control electronics 30.

To monitor changes in the video signal, for example, corresponding to updating of the image, different image frames contained within portions of the video signal may be compared. The frames compared need not be from consecutive images or frames, but may be spaced apart farther in time. In various implementations, however, the first and second time are not greater than 10 seconds apart, 5 seconds apart, 3 seconds apart, 2 seconds apart, 1 second apart, 0.75 seconds apart, 0.5 seconds apart, 0.4 seconds apart, 0.3 seconds apart, 0.25 seconds apart, 0.2 seconds apart, 0.15 seconds apart, 0.1 second apart, 0.08 seconds apart, 0.05 seconds apart, 0.04 seconds apart, 0.03 seconds apart, 0.02 seconds apart, 0.018 seconds apart, 0.016 seconds apart, 0.015 seconds apart, 0.012 seconds apart, 0.01 seconds apart, 0.008 seconds apart, 0.006 seconds apart, 0.005 seconds apart, 0.004 seconds apart, 0.003 seconds apart, 0.002 seconds apart, 0.001 seconds apart, 0.0008 seconds apart, 0.0005 seconds apart, 0.0002 seconds apart, 0.0001 seconds apart, or any range formed by any of these values or possibly more or less time. Times outside these ranges are also possible. Likewise, portions of the video signal for consecutive frames can be compared, or the frames may be separated by 1 frame, 2 frames, 3 frames, 4 frames, 5 frames, 6 frames, 7 frames, 8 frames, 9 frames, 10 frames, 15 frames, 20 frames, 25 frames, 30 frames, 40 frames, 50 frames, 60 frames, 70 frames, 80 frames, 90 frames, 100 frames, 120 frames, 140 frames, 150 frames, 160 frames, 180 frames, 200 frames, 220 frames, 240 frames, 250 frames, 280 frames, 300 frames, or any range formed by any of these values or possible more frames.

Figure 12:
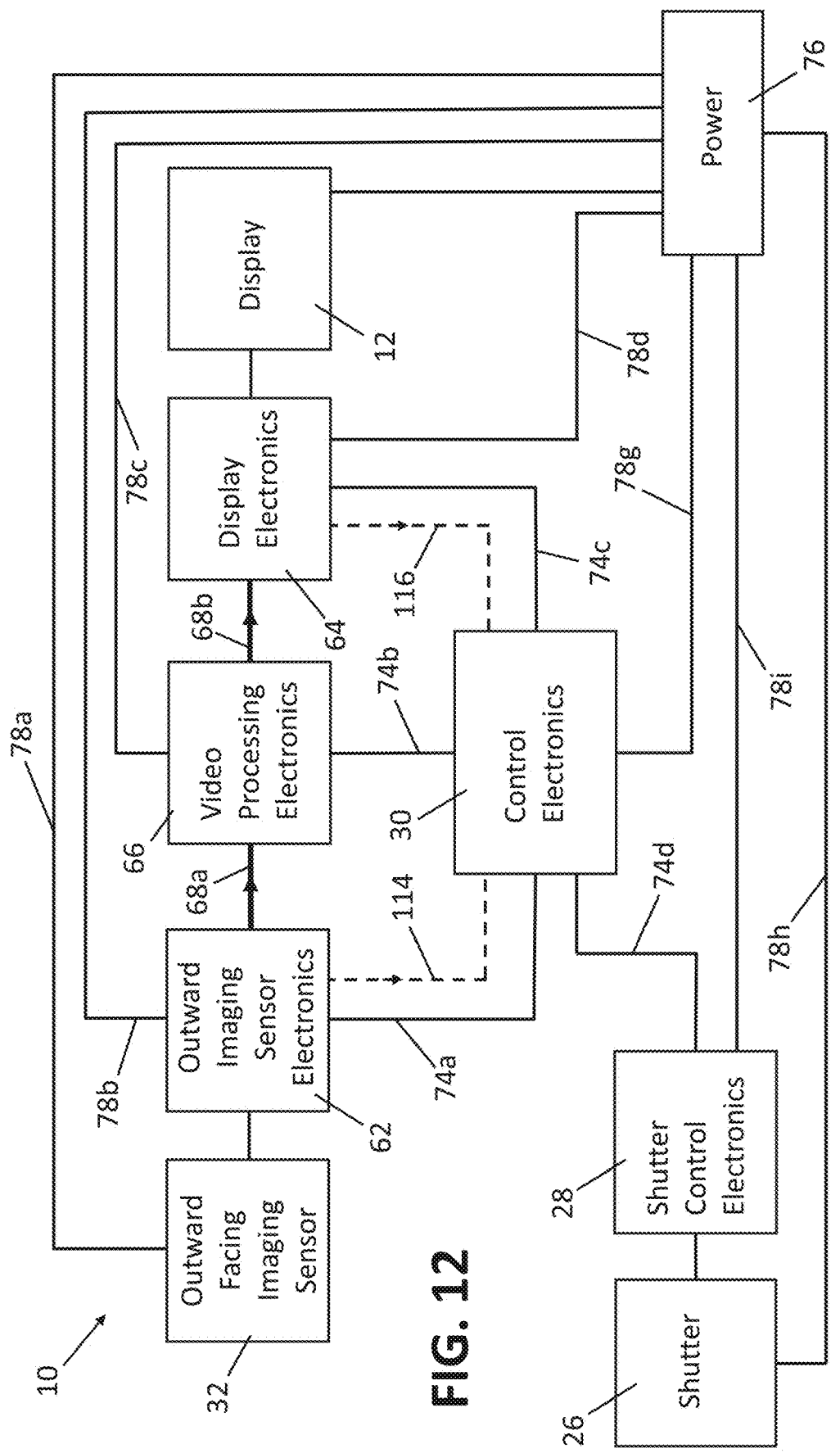
FIG. 12 is a block diagram of a system such as shown in FIG. 5 additionally configured to receive signals from outward facing imaging sensor electronics and/or display electronics in implementations where the outward facing imaging sensor electronics and/or display electronics output a signal indicative of whether the outward facing imaging sensor electronics and/or display electronics are properly functioning or malfunctioning.

FIG. 12 illustrates another approach to monitoring the operation of the augmented reality system 10. In particular, the outward imaging sensing electronics (e.g. detector array electronics) 62 and/or the display electronics 64 may be configured to output a signal indicative of whether the augmented display system 10 is experiencing disruption and/or degradation in images captured and/or to be rendered by the display 12 or not. Accordingly, FIG. 12 shows a block diagram of an augmented reality system 10 similar to that shown in FIG. 5 further comprising electrical signal lines 114, 116 configured to convey such a signal or signals from the outward imaging sensing electronics 62 and/or the display electronics 64, respectively to the control electronic 30. The electrical signal line 114 electrically connecting the outward imaging sensing electronics 62 to the control electronics 30 may enable proper operation of the outward facing imaging sensor 32 and/or associated electronics 62 to be monitored. Similarly, the electrical signal line 116 electrically connecting the display electronics 64 to the control electronics 30 may enable proper operation of the display electronics and/or the upstream outward facing imaging sensor 32 and/or outward facing imaging sensor electronics 62.

The electronic signal lines 114, 116 may comprise, for example, one or more conductive pathways such as conductive lines on a printed circuit board, wires, buses, cables, electric leads, pins, connectors, conductive pathways in or on a semiconductor integrated circuit (e.g., chip) or any combination thereof. Other types of conductive lines and/or other configurations are also possible.

In one or more designs, wireless communication (e.g., BlueTooth®, IOT—Internet of Things, etc.) may be used for electrical communication, for example, between the control electronics 30 and the outward facing imaging sensor electronics (e.g., detector array electronics) 62, the control electronics and the display electronics 64, or any combination of these. In some such designs, wireless, RF, or radio transmitters, receivers, and/or transceivers, which may in some cases be in one or more of the control electronics 30, the outward facing imaging sensor electronics (e.g., detector array electronics) 62, or the display electronics 64, may be used to communicate between devices.

In various designs, the outward facing imaging sensor electronics (e.g., detector array electronics) 62 and/or display electronics 64 may be configured to monitor one or more pixels. For example, the outward facing imaging sensor electronics 62 may be configured to detect an electrical output (e.g., a voltage, current or charge) output by one or more pixels of the outward imaging sensor (e.g., detector array for the outward facing camera) 32 and output a diagnostic signal to the electronic signal line 114 indicative that an electrical output (e.g., voltage, current, or charge) output is or is not detected. In some designs, the diagnostic signal is provided from the outward facing imaging sensor electronics 62 to the control electronics 30 and indicates whether the one or more pixels appear to be operating and receiving light indicative that the outward facing imaging sensor (e.g., detector array for the outward facing camera) is likely capturing images. In some designs, the diagnostic signal may indicate that one or more pixels is not producing an electrical output (e.g., a voltage, current or charge), and that the outward facing imaging sensor (e.g., detector array the outward facing camera) 32 or possibly the outward facing imaging sensor electronics (e.g., detector array electronics) 62 itself is not functioning or functioning properly.

In some implementations, the outward facing imaging sensor electronics 62 may be configured to monitor for change in an electrical output (e.g., a voltage, current or charge) output by one or more pixels of the outward imaging sensor (e.g., detector array for the outward facing camera) 32 and output a diagnostic signal to the electronic signal line 114 indicative that an electrical output (e.g., voltage, current, or charge) output is or is not changing. In some designs, the diagnostic signal may indicate that the one or more pixels appear to be operating and that the outward facing imaging sensor (e.g., detector array for the outward facing camera) 32 is likely updating images. In some designs, the diagnostic signal may indicate that one or more pixels is not updating an electrical output (e.g., a voltage current, or charge), and that the outward facing imaging sensor (e.g., detector array the outward facing camera) 32 or possibly the outward facing imaging sensor electronics (e.g., detector array electronics) 62 itself is not functioning or functioning properly.

Likewise, in some designs, the display electronics 64 may be configured to determine when signals are applied to one or more pixels of the display 12 and output a diagnostic signal to the electronic signal line 116 indicative that signals are applied to the one or more pixels of the display or are not. Accordingly, in some designs, the diagnostic signal may indicate that the display electronics 64 appear to be operating and receiving and/or providing electrical signals to control the one or more pixels on the display 12. In some designs, the diagnostic signal may indicate that the display electronics 64 is not operating properly, e.g., not providing electrical signals to control the one or more pixels on the display 12 and or possibly that one or more upstream components (e.g., outward facing imaging sensor 32, outward facing imaging sensor electronics 62 and/or video processing electronics 66) are not operating properly, e.g., such that the display electronics 64 are not receiving electrical signals to control the one or more pixels on the display.

In some implementations, the display electronics 64 may be configured to determine when signals applied to one or more pixels of the display 12 change and output a diagnostic signal to the electronic signal line 116 indicative whether signals applied to the one or more pixels of the display are being updated or not. In some designs, the diagnostic signal indicates whether the display electronics 64 and other upstream components (e.g., outward facing imaging sensor 32, outward facing imaging sensor electronics 62, video processing electronics 66) appear to be operating, e.g., updating electrical signals for controlling the one or more pixels on the display 12. In some designs, the diagnostic signal may indicate that the display electronics 64 and/or one or more upstream components are not operating properly such that the display electronics is not updating electrical signals for controlling the one or more pixels on the display 12.

In some implementations, the outward facing imaging sensor electronics 62 and/or display electronics 64 may be configured to monitor the images for defects such as described above. Such defects or degradation may include, for example, reduced spatial resolution, one or more dead sections of the image caused potentially by one or more dead sections of the display 12 (e.g., one or more pixels of the display) and/or one or more dead section of the outward facing imaging sensor or camera 12 (e.g., one or more pixels of the optical detector array 32), a partially filled display wherein the images are reduced or squeezed in size and only cover a portion of the display, leftover noise, ghosting or any combination of these. In some cases, the degradation may be temporally varying such as temporally varying noise (e.g., time varying noise). In other cases, the image may exhibit a spatial defect that does not change temporally. Examples of such spatial defects include dead zones, spatial noise such as pixels that do not display the image and are either dark or simply do not coinciding with the bulk of the image displayed or possibly the image has otherwise gone black. In some cases, these pixels are randomly located and/or have different colors. In some cases, the images stop updating and a ghost image remains. This ghost image may persist or may fade, e.g., to a blank screen such as a black screen or possibly to random spots. Other variations in defects, temporal, spatial, and/or otherwise are possible. Likewise, other forms of defects in the image captured and/or displayed may be detected.

As discussed above, defects and/or degradation can be detected in various ways, which can potentially be combined. In some implementations, for example, frames are stored and compared to detect the emergence of a defect. In some implementations, artificial intelligence and/or machine learning may be employed to detect defects and/or degradation. Object detection or other forms of artificial intelligence-based image analysis, and combinations thereof may be employed. For example, object detection may detect dead zones or random pixels that do not coincide with the image (e.g., static noise comprising pixels of random and/or different color).

As discussed above, the outward facing imaging sensor electronics 62 and/or display electronics 64 may be configured to detect many of these defects. In various implementations, artificial intelligence may be employed to detect such defects. The head mounted display may, for example, be trained to detect one or more defects. In some cases, these defects may not change from frame to frame. In some cases, only a portion of the image, image field, or display 12 or only number of pixels (e.g., less than 95%, less than 90%, less than 80%, less than 75%, less than 60%, less than 50%, less than 25%, less than 10%, less than 5%, less than 2%, less than 1%, or any range formed by any of these values) are monitored. In some implementations, noise can be detected by a high pass filter, or possibly a flicker detector.

As discussed above, in various implementations, the control electronics 30 may be configured to open the shutter 26 upon disruption of new video images for over a period of time, T, and/or image degradation is detected. Accordingly, in various implementations, circuitry monitors the signal(s) (e.g., a voltage, current, or charge) from the outward facing imaging sensor electronics 62 and/or display electronics 64 indicative whether such disruption and/or image degradation has or has not occurred. If the signal is a voltage, the circuitry may comprise an analog to digital converter to sample the voltage and output a digital signal, which may be provided to the microcontroller or microprocessor and/or one or more FPGAs or other circuitry in some designs for evaluation, for example, to monitor for changes or lack thereof as describe above. In some implementations, if the signal output from the outward facing imaging sensor electronics 62 and/or display electronics 64 is a current, the current may be converted to a voltage using one or more resistors. In some designs, at least one resistor is electrically coupled to an input node of an op amp such that the current is transformed into a voltage at the input of the op amp and a voltage signal is output from the op amp. The output of the op amp may, in some designs, be electrically coupled to an ADC, which samples the voltage and outputs a digital signal. The current is thus converted into a digital signal for monitoring. In some implementations, this digital signal is provided to the microcontroller, microprocessor and/or one or more FPGAs and/or other circuitry, which can digitally monitor the signal for changes or lack thereof, etc. The control electronics 30 may be programmed to open the shutter 26 when such disruption and/or degradation is detected. Other approaches are possible.

As discussed above, the electrically switchable shutter 26 generally remains closed while the video images captured by the outward facing imaging sensor (e.g., outward facing camera) 32 are being displayed to the user 18. The shutter 26 can block light from the environment 36 in front of the user 18, which may otherwise wash-out images displayed to the user and make the black features more difficult to accurately represent in an image formed by the display. The result can be higher contrast in strong ambient lighting and black objects can be represented in a more realistic manner by the display as the black object can be made opaque as opposed to partially transparent.

In some cases, however, the user 18 may prefer to have the shutter 26 open and see the environment in front of the user's eye 16 directly through the eyepiece 15. In such scenarios, the user 18 may set the shutter 16 to an open state. The augmented reality system 10 may include, for example, an input in which the user 18 can select a mode wherein the shutter 16 is open. This input may comprise, for example, a switch, a touch screen, or other type of interface to receive user input including, e.g., possibly gesture recognition, voice recognition, etc.

Augmented reality image content can still be displayed to the user 18 and be superimposed on the view observed by the user's eye 16 directly through the eyepiece 15. In various implementations, the head mounted display 10 may be configured such that when bright light is detected, the shutter 26 is closed. The control electronics 30 may be configured to close the shutter 26 when light bright light is detected by the outward facing imaging sensor 32 and/or one or more other light sensors configured to collect and/or receive light from the environment 36 in front of the user 18. In various implementations, such one or more light sensors may be outward facing.

Figure 13:
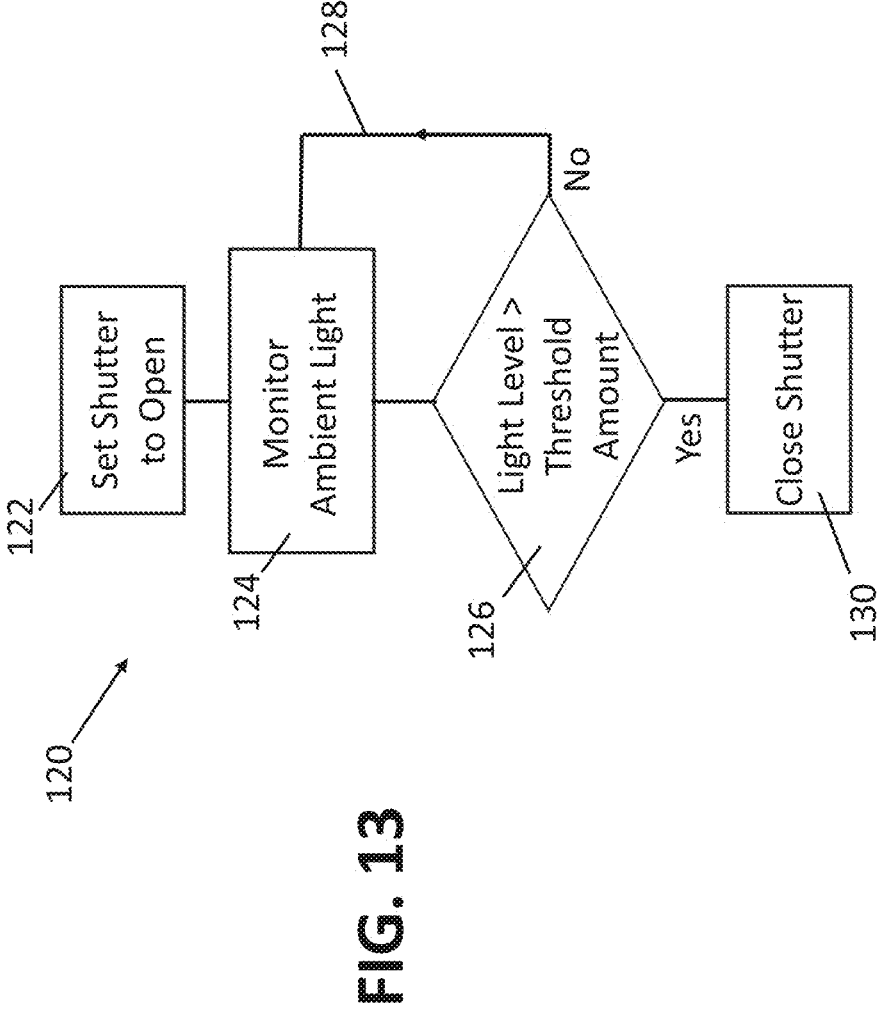
FIG. 13 is a flow chart illustrating a mode where the user has set the shutter to be open and the augmented reality system monitors for bright surges in intensity in the environment to which the eyes are exposed and closes the shutter in response to detection of such brightness surges.

FIG. 13 is a flow chart 120 illustrating how the augmented display system 10 can be configured to close the shutter 26 when the user 18 is exposed to bright light while the shutter is set in an open state. At the initial block 122, the shutter 26 is set to be open, for example, by the user 18 via a user interface such as a switch, touchscreen, voice recognition, etc. or the head mounted display may start up with the shutter in the open mode. In the next, main block 124, the ambient light, e.g., forward of the user 18 is monitored. As discussed above, the outward facing imaging sensor (e.g., outward facing camera) 32 and/or one or more light sensors may be positioned to detect light forward of the user 18 or otherwise that would enter the user's eye 16. Such a light sensor may comprise, for example, a photovoltaic or photoconductive optical detector. The one or more light sensors may be mounted on a housing for the head mounted display 40 such as the display housing 52, eyepiece or shutter housing 54, etc. so as to look forward of the user 18. The flow chart 120 includes a decision diamond 126 where a light level (e.g., luminance) measured by the outward facing imaging sensor 32 and/or the one or more light sensors is compared with a threshold value (e.g., of luminance). If the measured light level (e.g., luminance) is less than the threshold value, the outward facing imaging sensor 32 and/or the one or more light sensors continues to monitor the light level forward of the user 18 as depicted by the path 128 to the main block 124 of the flow chart. If, however, the light level (e.g., luminance) measured by the outward facing imaging sensor 32 and/or the one or more light sensors exceeds the threshold amount, the shutter 26 is closed as illustrated in block 130.

In such instances, the shutter 26 may be closed fairly quickly. For example, the shutter may close in 2-4 milliseconds but may close faster or slower. The shutter may, for example, be configured to close in 0.5 seconds, 0.3 seconds, 0.2 seconds, 0.1 seconds, 0.08 seconds, 0.05 seconds, 0.03 seconds, 0.02 seconds, 0.01 seconds, 0.008 second, 0.005 seconds, 0.003 seconds, 0.002 seconds, 0.001 seconds, 0.8 millisecond, 0.5 milliseconds, 0.3 milliseconds, 0.2 milliseconds, 0.1 milliseconds, or any range formed by any of these values or possibly faster or slower or shorter or longer in duration.

One use of such a feature on the head mounted display 40 is to shield the user's eye 16 from bright lights. If, for example, the user's eye 16 are dark adapted, the user 18 may be interested in avoiding bright light so as to keep the eyes sensitive to low levels of light. By limiting exposure to light, the eyes are able to see in fairly dark conditions. Sudden exposure to light, for example, a flashlight, a headlight, a gun flash, an explosion, a flare, etc., may cause the eye to no longer be dark adapted and be unable to see as a result. Recovering such dark adaption may take a long time. If, however, the shutter 26 can be closed quick enough, the eye 16 may be sufficiently shielded from the bright light to retain the dark-adapted state and to be able to see without interruption. The display 12, for example, can render images of the environment 36 forward of the user's eye captured by the outward facing imaging sensor (outward facing camera) 32 when the shutter 12 is closed.

In some cases, a mode (e.g., possibly a default mode) where the shutter is open may be used when the user knows they want to keep their dark-adapted eye state. In some situations, for example, a mix of sensor plus see-through imagery is useful. Such a case may exist, for example, when the outward facing imaging sensor 32 comprises a night vision camera. If the environment forward of the user got too bright, however, the shutter 26 would close, preserving night vision.

In various implementations, therefore, the control electronics 30 may be in electrical communication with the one or more light sensors or the outward facing imaging sensor 32 and/or sensor electronics 62, video processing electronics 66, display electronics 64, etc., and may be configured to close the shutter 26 if the light detected by the one or more light sensors or the outward facing imaging sensor 32 exceeds the threshold. In some implementations, for example, the control electronics 30 monitors the light level in the image captured by the outward facing imaging sensor (e.g., camera) 32. The control electronics 30 may be configured to close the shutter 26 when, for example, the average or peak light level in the captured image(s) exceeds a threshold. In other implementations, the control electronics 30 monitors a signal output by one or more outward facing light sensors. The control electronics 30 may be configured to close the shutter 26 when, for example, the one or more outward facing light sensors indicate that the light level forward of the user 18 exceed a threshold. Other configurations, however, are possible.

Although various designs are discussed above wherein the head mounted display is configured to close the shutter if light (e.g., ambient light or light forward the user) is detected that exceeds a threshold amount when the head mounted display is in an override mode where the shutter 26 is set to an open state, such a feature is not limited devices with an override mode. For example, a head mounted display with a shutter 26 may be configured to have the shutter be in an open state as a default, e.g., when the head mounted display is initially turned on, put on, and/or activated by the user. Moreover, a head mounted display with a shutter 26, regardless of how the shutter is used or configured to be operated, may be configured to close the shutter if the light is detected (e.g., by the one or more light sensors or the outward facing imaging sensor 32) that exceeds a threshold amount. In fact, in certain implementations, the primary or even sole purpose of the shutter 26 may be to close the shutter if the light is detected (e.g., by the one or more light sensors or the outward facing imaging sensor 32) that exceeds a threshold amount, for example, to protect the user's eyes and/or to maintain dark adapted states. In various such designs, however, an outward facing imaging sensor 32 is included in the head mounted display to provide images of the ambient environment, e.g., forward of the user, when the shutter 26 is closed.

In various implementations, variable shutter control is provided in the head mounted display, for example, by the shutter electronics 28 and shutter 26. For example, the head mounted display may have an open shutter state and a closed shutter state and one or more intermediate states between the open shutter state and the closed shutter state where more light passes through the shutter 26 than when the shutter is in the closed shutter state but passes less light than when the shutter is in said open shutter state. In some implementations, the shutter has a plurality of intermediate states. The control electronics 30, shutter electronics 28, shutter 26, or any combination of these or possibly one or more other components of the head mounted display, for example, may be configured such that the shutter may opened a certain amount controlled by the user, which may be one or more intermediate amounts between being open and closed. For example, the head mounted display may have a user interface for controlling the extent that the shutter 26 is open. In some designs, the shutter 26 may have 20 intermediate states, 15 intermediate states, 12 intermediate states, 10 intermediate states, 9 intermediate states, 8 intermediate states, 7 intermediate states, 6 intermediate states, 5 intermediate states, 4 intermediate states, 3 intermediate states, 2 intermediate states, 1 intermediate states, or any range formed by any of these values or possibly larger or smaller. However, in various implementations, the shutter 26 has on and off states with no intermediate states. In some implementations, control electronics 30, shutter electronics 28, shutter 26, or any combination of these or possibly one or more other components of the head mounted display may restrict the shutter to simply an open state and a closed state without one or more intermediates therebetween.

In various designs, the shutter 26, when closed, is configured to completely occlude or block the view of the user forward through the shutter, the beam combiner 20, the eyepiece 15, or the head mounted display 40 or any combination of these. The shutter 26 may, for example, have sufficiently large spatial extent (e.g., with regard to the beam combiner 20 and/or eyepiece 15) and be configured, when set to block light, to completely obstruct or block the user's view of the environment forward the user through the beam combiner, eyepiece, head mounted display 40, or any combination thereof. Accordingly, in various implementations, when the shutter 26 in a closed state wherein some light is blocked by the shutter, the user cannot see the area forward of any one or more of the shutter, the beam combiner 20, the eyepiece 15, or the head mounted display 40 by sensing light transmitted through any one or more of the shutter, the beam combiner, the eyepiece, or head mounted display. Similarly, in various implementations, the shutter 26 is closed on average for sufficient periods of time such that the user does not perceive the area forward of any one or more of the shutter, the beam combiner 20, the eyepiece 15, or the head mounted display 40 by sensing light transmitted through any one or more of the shutter, the beam combiner, the eyepiece, or the head mounted display.

As discussed above, in one or more designs, wireless communication (e.g., BlueTooth®, IOT—Internet of Things, etc.) may be used for communicating between devices and/or delivering power from and/or to different devices. Such devices may include for example, the power supply 76, the control electronics 30, the outward facing imaging sensor 32, the outward facing imaging sensor electronics (e.g., detector array electronics) 62, video processing electronics 66, the display electronics 64, the display 12, the shutter 26, the shutter electronics 28, power monitoring circuits or any combination of these. This power may be from the power supply 76. In some designs, wireless, RF, or radio transmitters, receivers, and/or transceivers, which may in some cases be in one or more of the power supply 76, the control electronics 30, the outward facing imaging sensor 32, the outward facing imaging sensor electronics (e.g., detector array electronics) 62, video processing electronics 66, the display electronics 64, the display 12, the shutter 26, the shutter electronics 28, power monitoring circuits or any combination of these may be used to provide communication links between and/or deliver power to devices. In various designs, wireless communication (e.g., BlueTooth®, IOT—Internet of Things, etc.) may be used to communicate between any two or more of the devices shown in FIGS. 5-7, 9, and 11-12 and/or to deliver power to any one or more of the devices shown in these figures. In some implementations, for example, wireless communication (e.g., BlueTooth®, IOT—Internet of Things, etc.) may be used to communicate between the outward facing imaging sensor 32 and the outward facing imaging sensor electronics 62, the display electronic 64 and the display 12 and/or the shutter 26 and the shutter electronics 28. In some designs, wireless communications (e.g., BlueTooth®, IOT—Internet of Things, etc.) may be used to communicate between the controller 30 and any of the devices shown in FIGS. 5-7, 9, and 11-12.

EXAMPLE EMBODIMENTS

Various additional example embodiments of the disclosure can be described by the following examples:

Part I—Electronics Configured to Monitor System and Open Shutter if Malfunction Detected 1. A head mounted display configured to provide an image for viewing by a user wearing said head mounted display, said head mounted display comprising:

a frame configured to be worn by said user;

a display supported by said frame, said display configured to output light to form images;

a beam combiner that is partially reflective and partially transmissive;

an electrically switchable shutter having a closed state that blocks light;

an outward facing imaging sensor facing an area forward of said shutter to capture images of said area forward of said shutter for presentation of said images on said display for viewing by said eye; and circuitry configured to control said shutter, wherein said electrically switchable shutter is disposed in an optical path between said beam combiner and said area forward of said shutter, wherein said beam combiner is positioned (i) in an optical path of said light output by said display such that at least a portion of said light from said display propagates to said beam combiner and then to said eye of the user to form images produced by said display that are viewable by said eye and (ii) in an optical path of light from said area forward of the shutter such that at least a portion of said light from said area forward of said shutter propagates to said beam combiner and then to said eye when said shutter is open, and wherein said circuitry is configured to detect degradation or disruption in imaging and/or display and to cause the shutter to be open in response to said degradation or disruption being detected.

Display Camera

2. The head mounted display of Example 1, further comprising a display imaging sensor configured to capture images of the display, said circuitry configured to open said shutter when images of said display captured by said display imaging sensor indicate said display has ceased rendering new images such that the user can view said area forward of said shutter through said open shutter.

3. The head mounted display of Example 2, wherein said circuitry is configured to monitor change or lack thereof in images captured by said display imaging sensor and to cause said shutter to open if such change in said images is not detected.

4. The head mounted display of Example 2, wherein said circuitry is configured to monitor change or lack thereof in images captured by said display imaging sensor and to cause said shutter to open if said change does not occur for at least a duration of time, T.

5. The head mounted display of any of Examples 2-4, wherein said display imaging sensor comprises an event imaging sensor or neuromorphic imaging sensor comprising pixels that asynchronously report changes in brightness detected.

6. The head mounted display of any of Examples 2-5, wherein said display imaging sensor is configured to capture images of only a portion the area of said display where images are displayed.

7. The head mounted display of any of Examples 2-6, wherein said display imaging sensor comprises a display camera comprising an optical detector array and at least one lens.

Display Sensor

8. The head mounted display of any of the examples above, further comprising a display sensor comprising an optical detector configured to receive light from at least a portion of said display and output at least one electrical signal, said circuitry configured to open said shutter based on electrical output or lack thereof from said optical detector of said display sensor that indicates said display has ceased rendering new images such that the user can view said area forward of said shutter through said open shutter.

9. The head mounted display of Example 8, wherein said circuitry is configured to monitor change or lack thereof in light detected by said display sensor and to cause said shutter to open if such change is not detected.

10. The head mounted display of Example 8, wherein said circuitry is configured to monitor change or lack thereof in light detected by said display sensor and to cause said shutter to open if such change is not detected for at least a duration of time, T.

11. The head mounted display of any of Examples 8-10, wherein said display sensor is configured to capture light from only a portion the area of said display where images are displayed.

12. The head mounted display of any of Examples 8-11, wherein at least a portion of said display from which said display sensor is configured to detect light is no more than 8 pixels.

Detector Chip Outputs Signal that the Detector Array Stopped Working

13. The head mounted display of any of the examples above, further comprising detector array electronics in electrical communication with said optical detector array of said outward facing sensor, said detector array electronics configured to output at least one electrical signal indicative of whether said optical detector array is capturing images, said circuitry configured to open said shutter when detector array electronics indicates said outward facing sensor has ceased capturing images such that the user can view said area forward of said shutter through said open shutter.

14. The head mounted display of Example 13, wherein said optical detector array comprises pixels configured to generate charge, current(s) and/or voltage(s) and said detector array electronics is configured to indicate when said charge and/or voltages are not being output by said optical detector array.

Detector Chip Outputs Signal the Detector Array Stopped Capturing New Images 15. The head mounted display of any of the examples above, further comprising outward facing imaging sensor electronics in electrical communication with said outward facing imaging sensor, said outward facing imaging sensor electronics configured to output at least one electrical signal indicative of whether a change in images captured by said outward facing imaging sensor has occurred, said circuitry configured to open said shutter when said outward facing imaging sensor electronics indicates no change in the images captured by said outward facing imaging sensor such that the user can view said area forward of said shutter through said open shutter.

Display Chip Outputs Signal the Display Stopped Working

16. The head mounted display of any of the examples above, further comprising display electronics in electrical communication with said display, said display electronics configured to output at least one electrical signal indicative of whether said display is functioning, said circuitry configured to open said shutter when said display electronics indicates said display is not functioning such that the user can view said area forward of said shutter through said open shutter.

17. The head mounted display of Example 16, wherein said display comprises pixels to which voltages are applied to display images and said display electronics are configured to indicate when said voltages are not being applied to pixels of said display.

18. The head mounted display of Example 16, wherein said display comprises pixels to which voltages, currents or charge are applied to display images and said display electronics are configured to indicate when said voltages, currents or charge are not being applied to pixels of said display.

Display Chip Outputs Signal the Display Stopped Displaying New Images

19. The head mounted display of any of the examples above, further comprising display electronics in electrical communication with said display, said display electronics configured to output at least one electrical signal indicative of whether a change in images displayed by said display has occurred, said circuitry configured to open said shutter when said display electronics indicates said display has ceased displaying new images such that the user can view said area forward of said shutter through said open shutter.

Monitor Video Signal from Outward Facing Imaging Sensor for Video Signal Updating 20. The head mounted display of any of the examples above, wherein said circuitry is configured to monitor video signals generated by said outward facing imaging sensor electronics and/or driving said display, said circuitry configured to output at least one electrical signal indicative of whether said video signal has ceased updating, said circuitry configured to open said shutter when said circuitry indicates that said video signal has ceased updating such that the user can view said area forward of said shutter through said open shutter.

21. The head mounted display of Example 20, wherein said video signal comprises a plurality of frames and wherein said circuitry monitors the updating of frames and indicates that said video signal is no longer updating when updating of said frames has ceased.

22. The head mounted display of Example 20, wherein said circuitry counts frames and indicates that said video signal has ceased updating when increases in frame count have stopped.

23. The head mounted display of any of Examples 20-22, wherein said circuitry is configured to open said shutter when said video signal has ceased updating for at least a time, T.

Monitor Video Signal from Outward Facing Imaging Sensor for Changes in Images in the Video 24. The head mounted display of any of the examples above, wherein said circuitry is configured to monitor video signals generated by said outward facing imaging sensor and/or electronics driving said display, said circuitry configured to output at least one electrical signal indicative of whether said images in said video have ceased changing, said circuitry configured to open said shutter when said circuitry indicates that images in said video have ceased changing such that the user can view said area forward of said shutter through said open shutter.

25. The head mounted display of Example 24, wherein said circuitry is configured to open said shutter when said images in said video has ceased changing for at least a time, T.

Shutter Open when No Power to the Camera

26. The head mounted display of any of the examples above, wherein said circuitry is configured to monitor power to said outward facing imaging sensor, said circuitry configured to open said shutter when said circuitry detects that insufficient power is being delivered to said outward facing imaging sensor such that the user can view said area forward of said shutter through said open shutter.

27. The head mounted display of any of the examples above, further comprising detector array electronics in communication with said optical detector array of said outward facing sensor, wherein said circuitry is configured to monitor power to said detector array electronics, said circuitry configured to open said shutter when said circuitry detects that insufficient power is being delivered to said detector array electronics such that the user can view said area forward of said shutter through said open shutter.

Shutter Open as Default when No Power to the Display

28. The head mounted display of any of the examples above, wherein said circuitry is configured to monitor power to said display, said circuitry configured to open said shutter when said circuitry detects that insufficient power is being delivered to said display such that the user can view said area forward of said shutter through said open shutter.

29. The head mounted display of any of the examples above, further comprising display electronics in communication with said display, wherein said circuitry is configured to monitor power to said display electronics, said circuitry configured to open said shutter when said circuitry detects that insufficient power is being delivered to said display electronics such that the user can view said area forward of said shutter through said open shutter.

Shutter Open as Default when No Power to the Shutter

30. The head mounted display of any of the examples above, wherein said shutter has a fail-safe open state wherein when power is no longer applied to said shutter, said shutter opens such that the user can view said area forward of said shutter through said open shutter.

31. The head mounted display of any of the examples above, wherein said electrically switchable shutter has a closed state that blocks light when power is applied to said shutter.

Intentionally Add Image Content that Changes the Images to be Monitored

32. The head mounted display of any of the examples above, further comprising video processing electronics configured to add content to said images displayed by said display, wherein said electronics is configured to change at least one pixel of said display at a rate of at least 1/T whether said display is rendering images that otherwise change or not.

Providing a Modulated Light Source to Illuminate Said Outward Facing Imaging Sensor 33. The head mounted display of any of the examples above, further comprising a light source configured to direct light to an optical detector array of said outward facing sensor.

34. The head mounted display of Example 33, wherein said light from said light source is configured to be modulated such that said light changes at a rate of at least 1/T.

35. The head mounted display of Example 33 or 34, wherein said light source is configured to direct light onto less than a tenth of the active light detecting elements of said optical detector array of said outward facing sensor.

36. The head mounted display of Example 33 or 34, wherein light source is configured to direct light onto less than 9 pixels of said optical detector array of said outward facing sensor.

Optical Fiber Coupled to Outward Facing Imaging Sensor Detector Array

37. The head mounted display of any of the examples above, comprising an optical fiber configured to optically couple light from a light source to an optical detector array of said outward facing imaging sensor.

38. The head mounted display of Example 37, wherein said optical fiber is configured to optically couple light from said light source to only some active light detecting elements of said optical detector array of said outward facing imaging sensor.

39. The head mounted display of Example 37, wherein said optical fiber is configured to optically couple light from said light source to no more than 8 pixels of said detector array of said outward facing imaging sensor.

Close Shutter when Detect High Brightness

40. The head mounted display of any of the examples above, wherein said circuitry includes an override mode wherein said circuitry is configured to open said shutter in response to user input such that the user can view said area forward of said shutter through said open shutter, and
  wherein at least during said override mode said circuitry is configured to monitor light levels of the environment forward of the user images for an increase beyond a threshold amount, said circuitry configured to close said shutter if said increase beyond a threshold amount is detected.

41. The head mounted display of Example 40, wherein at least during said override mode said circuitry is configured to monitor images captured by said outward facing imaging sensor for an increase in light level beyond a threshold amount, said circuitry configured to close said shutter if said increase beyond a threshold amount is detected.

42. The head mounted display of Example 40 or 41, wherein said light level is measured luminance.

Camera

43. The head mounted display of any of the examples above, wherein said outward facing imaging sensor comprises a camera comprising an optical detector array and at least one lens.

44. The head mounted display of any of the examples above, wherein said display comprises a liquid crystal display, an emissive display, a reflective display, or a digital micromirror (DMD) display.

45. The head mounted display of any of the examples above, wherein said shutter is partitioned into less than ten separately switchable regions.

46. The head mounted display of any of the examples above, wherein said shutter comprises no more than a single switching element.

47. The head mounted display of any of the examples above, wherein said shutter is closed on average for sufficient periods of time such that the user does not perceive the area forward of the shutter by sensing light transmitted through the shutter.

48. The head mounted display of any of the examples above, wherein said shutter is configured to remain closed most of the time.

49. The head mounted display of any of the examples above, wherein said shutter is configured to remain closed on average for periods of time in excess of 1 minute.

50. The head mounted display of any of the examples above, wherein said shutter is configured to remain closed on average for periods of time in excess of 10 minutes.

51. The head mounted display of any of the examples above, wherein said head mounted display includes a first shutter state wherein said shutter is open and transparent and a second shutter state wherein said shutter is closed and opaque and said head mounted display does not have a state between said first and second shutter states wherein said shutter is less optically transmissive than said first open and transparent shutter state and more optically transmissive than said second closed and opaque shutter state.

52. The head mounted display of any of the examples above, wherein the head mounted display provides an open shutter state and a closed shutter state and not one or more intermediate states between said first open shutter state and said closed shutter state where more light passes through said shutter than when said shutter is in said closed shutter state but passes less light than when said shutter is in said open shutter state.

53. The head mounted display of any of the examples above, wherein said head mounted display satisfies MIL-SPEC standards.

54. The head mounted display of any of the examples above, wherein said beam combiner comprises a prism.

55. The head mounted display of any of the examples above, wherein said beam combiner comprises a plate.

56. The head mounted display of any of the examples above, wherein said beam combiner comprises a waveguide.

57. The head mounted display of any of the examples above, wherein said beam combiner that is partially reflective and partially transmissive is positioned (i) in an optical path of said light output by said display so as to reflect at least a portion of said light from said display to said eye of the user to form images produced by said display that are viewable by said eye and (ii) forward of the eye so as to transmit light from forward of said beam combiner into said eye.

58. The head mounted display of any of the examples above, wherein said beam combiner comprises a prism having a partially reflective partially transmissive surface positioned to reflect at least a portion of said light from said display to said eye of the user to form images produced by said display that are viewable by said eye and to transmit light from forward of said beam combiner into said eye.

59. The head mounted display of any of the examples above, wherein the head mounted display provides an open shutter state and a closed shutter state and one or more intermediate states between said first open shutter state and said closed shutter state where more light passes through said shutter than when said shutter is in said closed shutter state but passes less light than when said shutter is in said open shutter state.

60. The head mounted display of any of the examples above, wherein said shutter is in a closed state, blocking some light, on average for sufficient periods of time such that the user does not perceive the area forward of the shutter by sensing light transmitted through the shutter.

61. The head mounted display of any of the examples above, wherein said shutter is in a closed state, blocking some light, on average for sufficient periods of time such that the user does not perceive the area forward of the beam combiner by sensing light transmitted through the beam combiner.

62. The head mounted display of any of the examples above, wherein said shutter is in a closed state, blocking some light, on average for sufficient periods of time such that the user does not perceive the area forward of the eyepiece by sensing light transmitted through the eyepiece of the head mounted display.

63. The head mounted display of any of the examples above, wherein said shutter is in a closed state, blocking some light, on average for sufficient periods of time such that the user does not perceive the area forward of the head mounted display by sensing light transmitted through the head mounted display.

64. The head mounted display of any of the examples above, wherein when said shutter is in a closed state wherein some light is blocked by the shutter, the user cannot see the area forward of the shutter by sensing light transmitted through the shutter.

65. The head mounted display of any of the examples above, wherein when said shutter is in a closed state wherein some light is blocked by the shutter, the user cannot see the area forward of the beam combiner by sensing light transmitted through the beam combiner.

66. The head mounted display of any of the examples above, wherein when said shutter is in a closed state wherein some light is blocked by the shutter, the user cannot see the area forward of the eyepiece by sensing light transmitted through the eyepiece of the head mounted display.

67. The head mounted display of any of the examples above, wherein when said shutter is in a closed state wherein some light is blocked by the shutter, the user cannot see the area forward of the head mounted display by sensing light transmitted through the head mounted display.

Part II—Close Shutter when Detect High Brightness

1. A head mounted display configured to provide an image for viewing by a user wearing said head mounted display, said head mounted display comprising:
   a frame configured to be worn by said user;
   a display supported by said frame, said display configured to output light to render images;
   a beam combiner that is partially reflective and partially transmissive;
   an electrically switchable shutter having a first closed state that blocks light;
   an outward facing imaging sensor facing an area forward of said shutter to capture images of said area forward of said shutter and to present said images on said display for viewing by said eye; and electronics configured to control said shutter, wherein said electrically switchable shutter is disposed in an optical path between said beam combiner and said area forward of said shutter, wherein said beam combiner is positioned (i) in an optical path of said light output by said display such that at least a portion of said light from said display propagates to said beam combiner and then to said eye of the user to form images produced by said display that are viewable by said eye and (ii) in an optical path of light from said area forward of the shutter such that at least a portion of said light from said area forward of said shutter propagates to said beam combiner and then to said eye when said shutter is open, and wherein said electronics is configured to monitor light levels of the area forward of the shutter for an increase beyond a threshold amount, said electronics configured to close said shutter if said increase beyond a threshold amount is detected.

2. The head mounted display of Example 1, wherein said electronics is configured to monitor luminance of the area forward of the shutter for an increase in luminance beyond a threshold amount, said electronics configured to close said shutter if said increase in luminance beyond a threshold amount is detected.

3. The head mounted display of Example 1, wherein said electronics is configured to monitor images captured by said outward facing imaging sensor for an increase in light level beyond a threshold amount, said electronics configured to close said shutter if said increase in light level beyond a threshold amount is detected.

4. The head mounted display of Example 1, wherein said electronics is configured to monitor images captured by said outward facing imaging sensor for an increase in luminance beyond a threshold amount, said electronics configured to close said shutter if said increase in luminance beyond a threshold amount is detected.

5. The head mounted display of Example 1, further comprising a light sensor, wherein said electronics is configured to monitor output of said light sensor for an increase in light level beyond a threshold amount, said electronics configured to close said shutter if said increase in light level beyond a threshold amount is detected.

6. The head mounted display of Example 1, further comprising a light sensor, wherein said electronics is configured to monitor output of said light sensor for an increase in luminance beyond a threshold amount, said electronics configured to close said shutter if said increase in luminance beyond a threshold amount is detected.

7. The head mounted display of any of Examples 1-6, wherein said increase in light level comprises an increase above a threshold set by the user.

8. The head mounted display of any of Examples 1-7, wherein said increase in light level comprises an increase of a certain amount above the ambient light level.

9. The head mounted display of Example 8, wherein said certain amount above the ambient light level is set by the user.

10. The head mounted display of any of the examples above, wherein said display comprises a liquid crystal display, an emissive display or a reflective display.

11. The head mounted display of any of the examples above, wherein said shutter is partitioned into less than ten separately switchable regions.

12. The head mounted display of any of the examples above, wherein said shutter comprises no more than a single switching element.

13. The head mounted display of any of the examples above, wherein said shutter is closed on average for sufficient periods of time such that the user does not perceive the area forward of the shutter by sensing light transmitted through the shutter.

14. The head mounted display of any of the examples above, wherein said shutter is configured to remain closed most of the time.

15. The head mounted display of any of the examples above, wherein said shutter is configured to remain closed on average for periods of time in excess of 1 minute.

16. The head mounted display of any of the examples above, wherein said shutter is configured to remain closed on average for periods of time in excess of 10 minute.

17. The head mounted display of any of the examples above, wherein said head mounted display includes a first shutter state wherein said shutter is open and transparent and a second shutter state wherein said shutter is closed and opaque and said head mounted display does not have a state between said first and second shutter states wherein said shutter is less optically transmissive than said first open and transparent shutter state and more optically transmissive than said second closed and opaque shutter state.

18. The head mounted display of any of the examples above, the head mounted display provides an open shutter state and a closed shutter state and not one or more intermediate states between said first open shutter state and said closed shutter state where more light passes through said shutter than when said shutter is in said closed shutter state but passes less light than when said shutter is in said open shutter state.

19. The head mounted display of any of the examples above, wherein said head mounted display satisfies MIL-SPEC standards.

20. The head mounted display of any of the examples above, further comprising circuitry configured to detect degradation or disruption in imaging and/or display and to cause the shutter to be open in response to said degradation or disruption being detected.

21. The head mounted display of any of the examples above, wherein said beam combiner comprises a prism.

22. The head mounted display of any of the examples above, wherein said beam combiner comprises a plate.

23. The head mounted display of any of the examples above, wherein said beam combiner comprises a waveguide.

24. The head mounted display of any of the examples above, wherein said beam combiner that is partially reflective and partially transmissive is positioned (i) in an optical path of said light output by said display so as to reflect at least a portion of said light from said display to said eye of the user to form images produced by said display that are viewable by said eye and (ii) forward of the eye so as to transmit light from forward of said beam combiner into said eye.

25. The head mounted display of any of the examples above, wherein said beam combiner comprises a prism having a partially reflective partially transmissive surface positioned to reflect at least a portion of said light from said display to said eye of the user to form images produced by said display that are viewable by said eye and to transmit light from forward of said beam combiner into said eye.

26. The head mounted display of any of the examples above, wherein the head mounted display provides an open shutter state and a closed shutter state and one or more intermediate states between said first open shutter state and said closed shutter state where more light passes through said shutter than when said shutter is in said closed shutter state but passes less light than when said shutter is in said open shutter state.

27. The head mounted display of any of the examples above, wherein said shutter is in a closed state, blocking some light, on average for sufficient periods of time such that the user does not perceive the area forward of the shutter by sensing light transmitted through the shutter.

28. The head mounted display of any of the examples above, wherein said shutter is in a closed state, blocking some light, on average for sufficient periods of time such that the user does not perceive the area forward of the beam combiner by sensing light transmitted through the beam combiner.

29. The head mounted display of any of the examples above, wherein said shutter is in a closed state, blocking some light, on average for sufficient periods of time such that the user does not perceive the area forward of the eyepiece by sensing light transmitted through the eyepiece of the head mounted display.

30. The head mounted display of any of the examples above, wherein said shutter is in a closed state, blocking some light, on average for sufficient periods of time such that the user does not perceive the area forward of the head mounted display by sensing light transmitted through the head mounted display.

31. The head mounted display of any of the examples above, wherein when said shutter is in a closed state wherein some light is blocked by the shutter, the user cannot see the area forward of the shutter by sensing light transmitted through the shutter.

32. The head mounted display of any of the examples above, wherein when said shutter is in a closed state wherein some light is blocked by the shutter, the user cannot see the area forward of the beam combiner by sensing light transmitted through the beam combiner.

33. The head mounted display of any of the examples above, wherein when said shutter is in a closed state wherein some light is blocked by the shutter, the user cannot see the area forward of the eyepiece by sensing light transmitted through the eyepiece of the head mounted display.

34. The head mounted display of any of the examples above, wherein when said shutter is in a closed state wherein some light is blocked by the shutter, the user cannot see the area forward of the head mounted display by sensing light transmitted through the head mounted display.

35. The head mounted display of any of the examples above, wherein said electronics includes an override mode wherein said electronics is configured to set said shutter in an open state in response to user input such that the user can view said area forward of said shutter through said open shutter.

36. The head mounted display of any of the examples above, wherein said electronics includes a default mode wherein said electronics sets said shutter to an open state such that the user can view said area forward of said shutter through said open shutter.

37. The head mounted display of Example 36, wherein said default mode is the default setting when said head mounted display is turned on.

38. The head mounted display of Example 36, wherein said default mode is the default setting when said head mounted display is put on the user.

39. The head mounted display of Example 36, wherein said default mode is the default setting when said head mounted display is activated by the user.

Part III

1. A head mounted display configured to provide an image for viewing by a user wearing said head mounted display, said head mounted display comprising:
   a frame configured to be worn by said user;
   a display supported by said frame, said display configured to output light to form images;
   a beam combiner that is partially reflective and partially transmissive;
   an electrically switchable shutter having a first closed state that blocks light when electrical power is applied to said shutter; and
   a camera facing an area forward of said shutter to capture images of said area forward of said shutter and to present said images on said display for viewing by said eye,
   wherein said electrically switchable shutter is disposed in an optical path between said beam combiner and said area forward of said shutter,
   wherein said beam combiner is positioned (i) in an optical path of said light output by said display such that at least a portion of said light from said display propagates to said beam combiner and then to said eye of the user to form images produced by said display that are viewable by said eye and (ii) in an optical path of light from said area forward of the shutter such that at least a portion of said light from said area forward of said shutter propagates to said beam combiner and then to said eye when said shutter is open, and
   wherein said shutter has a second fail-safe open state wherein when power is no longer applied to said shutter, said shutter opens such that the user can view said area forward of said shutter through said shutter.

2. The head mounted display of Example 1, wherein said display comprises a liquid crystal display, an emissive display, a reflective display.

3. The head mounted display of Example 1, wherein said shutter is partitioned into less than ten separately switchable regions.

4. The head mounted display of Example 1, wherein said shutter comprises no more than a single switching element.

5. The head mounted display of Example 1, wherein said shutter is closed on average for sufficient periods of time such that the user does not perceive the area forward of the shutter by sensing light transmitted through the shutter.

6. The head mounted display of Example 1, wherein said shutter is configured to remain closed most of the time.

7. The head mounted display of Example 1, wherein said shutter is configured to remain closed on average for periods of time in excess of 1 minute.

8. The head mounted display of Example 1, wherein said shutter is configured to remain closed on average for periods of time in excess of 10 minute.

9. The head mounted display of Example 1, wherein said head mounted display satisfies MIL-SPEC standards.

10. The head mounted display of Example 1, further comprising circuitry configured to detect degradation or disruption in imaging and/or display and to cause the shutter to be open in response to said degradation or disruption being detected.

11. The head mounted display of Example 1, wherein said beam combiner comprises a prism.

12. The head mounted display of Example 1, wherein said beam combiner has at least one curved surface.

13. The head mounted display of Example 1, wherein said beam combiner has at least one freeform surface.

14. The head mounted display of Example 1, wherein said beam combiner comprises flat forward and rearward surfaces.

15. The head mounted display of Example 1, wherein said beam combiner comprises a prism having a flat partially transmissive partially/reflective surface buried therein.

16. The head mounted display of Example 1, wherein said beam combiner comprises a plate.

17. The head mounted display of Example 1, wherein said beam combiner comprises a plane parallel plate.

18. The head mounted display of Example 1, wherein said beam combiner comprises a visor or curved partially transmissive/partially reflective window.

19. The head mounted display of Example 1, wherein said beam combiner comprises a waveguide.

20. The head mounted display of Example 1, wherein said beam combiner that is partially reflective and partially transmissive is positioned (i) in an optical path of said light output by said display so as to reflect at least a portion of said light from said display to said eye of the user to form images produced by said display that are viewable by said eye and (ii) forward of the eye so as to transmit light from forward of said beam combiner into said eye.

The head mounted display of Example 1, wherein said beam combiner comprises a prism having a partially reflective partially transmissive surface positioned to reflect at least a portion of said light from said display to said eye of the user to form images produced by said display that are viewable by said eye and to transmit light from forward of said beam combiner into said eye.

Terminology

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is to be understood within the context used in general to convey that an item, term, etc. may be either X, Y, or Z. Thus, such conjunctive language is not generally intended to imply that certain embodiments require the presence of at least one of X, at least one of Y, and at least one of Z.

Language of degree, as used herein, such as the terms "approximately," "about," "generally," and "substantially," represent a value, amount, or characteristic close to the stated value, amount, or characteristic that still performs a desired function or achieves a desired result. For example, the terms "approximately," "about," "generally," and "substantially" may refer to an amount that is within +10% of, within +5% of, within +2% of, within +1% of, or within +0.1% of the stated amount. As another example, the terms "generally parallel" and "substantially parallel" refer to a value, amount, or characteristic that departs from exactly parallel by +10 degrees, by +5 degrees, by +2 degrees, by +1 degree, or by +0.1 degree, and the terms "generally perpendicular" and "substantially perpendicular" refer to a value, amount, or characteristic that departs from exactly perpendicular by +10 degrees, by +5 degrees, by +2 degrees, by +1 degree, or by +0.1 degree.

Various configurations have been described above. Although this invention has been described with reference to these specific configurations, the descriptions are intended to be illustrative of the invention and are not intended to be limiting. Various modifications and applications may occur to those skilled in the art without departing from the true spirit and scope of the invention. Thus, for example, in any method or process disclosed herein, the acts or operations making up the method/process may be performed in any suitable sequence and are not necessarily limited to any particular disclosed sequence. Features or elements from various embodiments and examples discussed above may be combined with one another to produce alternative configurations compatible with embodiments disclosed herein. Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

What is claimed is:

1. A head mounted display configured to provide an image for viewing by a user wearing said head mounted display, said head mounted display comprising:

a frame configured to be worn by said user;

a display supported by said frame, said display configured to output light to form images;

a beam combiner that is partially reflective and partially transmissive;

an electrically switchable shutter having a closed state that blocks light;

an outward facing imaging sensor facing an area forward of said shutter to capture images of said area forward of said shutter for presentation of said images on said display for viewing by an eye of said user;

a display imaging sensor configured to capture images of most of the display; and circuitry configured to control said shutter, wherein said electrically switchable shutter is disposed in an optical path between said beam combiner and said area forward of said shutter, wherein said beam combiner is positioned (i) in an optical path of said light output by said display such that at least a portion of said light from said display propagates to said beam combiner and then to said eye of the user to form images produced by said display that are viewable by said eye and (ii) in an optical path of light from said area forward of the shutter such that at least a portion of said light from said area forward of said shutter propagates to said beam combiner and then to said eye when said shutter is open, wherein said circuitry is configured to detect degradation or disruption in capturing images of said area forward of said shutter and/or display of said captured images of said area forward of said shutter and to cause the shutter to be open in response to said degradation or disruption being detected, wherein when power is no longer applied to said shutter, said shutter opens such that the user can view said area forward of said shutter through said shutter; and wherein said circuitry is configured to open said shutter when images of said display captured by said display imaging sensor indicate said display has ceased rendering new images such that the user can view said area forward of said shutter through said open shutter.

2. The head mounted display of claim 1, wherein said circuitry is configured to monitor change or lack thereof in images captured by said display imaging sensor and to cause said shutter to open if such change in said images is not detected.

3. The head mounted display of claim 1, further comprising detector array electronics in electrical communication with an optical detector array of said outward facing imaging sensor, said detector array electronics configured to output at least one electrical signal indicative of whether said optical detector array is capturing images, said circuitry configured to open said shutter when said detector array electronics indicates said outward facing imaging sensor has ceased capturing images such that the user can view said area forward of said shutter through said open shutter.

4. The head mounted display of claim 1, further comprising outward facing imaging sensor electronics in electrical communication with said outward facing imaging sensor, said outward facing imaging sensor electronics configured to output at least one electrical signal indicative of whether a change in images captured by said outward facing imaging sensor has occurred, said circuitry configured to open said shutter when said outward facing imaging sensor electronics indicates no change in the images captured by said outward facing imaging sensor such that the user can view said area forward of said shutter through said open shutter.

5. The head mounted display of claim 1, further comprising display electronics in electrical communication with said display, said display electronics configured to output at least one electrical diagnostic signal indicative of whether said display is functioning, said circuitry configured to open said shutter when said display electronics indicates said display is not functioning such that the user can view said area forward of said shutter through said open shutter.

6. The head mounted display of claim 1, further comprising display electronics in electrical communication with said display, said display electronics configured to output at least one electrical diagnostic signal indicative of whether a change in images displayed by said display has occurred, said circuitry configured to open said shutter when said display electronics indicates said display has ceased displaying new images such that the user can view said area forward of said shutter through said open shutter.

7. The head mounted display of claim 1, wherein said shutter is partitioned into less than ten separately switchable regions.

8. The head mounted display of claim 1, wherein said shutter comprises no more than a single switching element.

9. The head mounted display of claim 1, wherein said shutter is closed on average for sufficient periods of time such that the user does not perceive the area forward of the shutter by sensing light transmitted through the shutter.

10. The head mounted display of claim 1, wherein said shutter is configured to remain closed most of the time.

11. The head mounted display of claim 1, wherein said head mounted display includes a first shutter state wherein said shutter is open and transparent and a second shutter state wherein said shutter is closed and opaque and said head mounted display does not have a state between said first and second shutter states wherein said shutter is less optically transmissive than said first open and transparent shutter state and more optically transmissive than said second closed and opaque shutter state.

12. The head mounted display of claim 1, wherein said head mounted display satisfies MIL-SPEC standards.

13. A head mounted display configured to provide an image for viewing by a user wearing said head mounted display, said head mounted display comprising:

a frame configured to be worn by said user;

a display supported by said frame, said display configured to output light to form images;

a beam combiner that is partially reflective and partially transmissive;

an electrically switchable shutter having a closed state that blocks light;

an outward facing imaging sensor facing an area forward of said shutter to capture images of said area forward of said shutter for presentation of said images on said display for viewing by an eye of said user;

a display sensor comprising an optical detector in front of, on or over and facing one or more pixels of said display to receive light from at least a portion of said display and output at least one electrical signal, circuitry configured to control said shutter, wherein said electrically switchable shutter is disposed in an optical path between said beam combiner and said area forward of said shutter, wherein said beam combiner is positioned (i) in an optical path of said light output by said display such that at least a portion of said light from said display propagates to said beam combiner and then to said eye of the user to form images produced by said display that are viewable by said eye and (ii) in an optical path of light from said area forward of the shutter such that at least a portion of said light from said area forward of said shutter propagates to said beam combiner and then to said eye when said shutter is open, wherein said circuitry is configured to detect degradation or disruption in capturing images of said area forward of said shutter and/or display of said captured images of said area forward of said shutter and to cause the shutter to be open in response to said degradation or disruption being detected, wherein when power is no longer applied to said shutter, said shutter opens such that the user can view said area forward of said shutter through said shutter; and wherein said circuitry is configured to open said shutter based on electrical output or lack thereof from said optical detector of said display sensor that indicates said display has ceased rendering new images such that the user can view said area forward of said shutter through said open shutter.

14. A head mounted display configured to provide an image for viewing by a user wearing said head mounted display, said head mounted display comprising:

a frame configured to be worn by said user;

a display supported by said frame, said display configured to output light to render images;

a beam combiner that is partially reflective and partially transmissive;

an electrically switchable shutter having a first closed state that blocks light;

an outward facing imaging sensor facing an area forward of said shutter to capture images of said area forward of said shutter and to present said images on said display for viewing by an eye of said user; and electronics configured to control said shutter, wherein said electrically switchable shutter is disposed in an optical path between said beam combiner and said area forward of said shutter, wherein said beam combiner is positioned (i) in an optical path of said light output by said display such that at least a portion of said light from said display propagates to said beam combiner and then to said eye of the user to form images produced by said display that are viewable by said eye and (ii) in an optical path of light from said area forward of the shutter such that at least a portion of said light from said area forward of said shutter propagates to said beam combiner and then to said eye when said shutter is open, wherein said electronics is configured to monitor light levels of the area forward of the shutter for an increase beyond a threshold amount, said electronics configured to close said shutter in 200 milliseconds to 0.1 milliseconds if said increase beyond a threshold amount is detected.

15. The head mounted display of claim 14, wherein said electronics is configured to monitor images captured by said outward facing imaging sensor for an increase in light level beyond a threshold amount, said electronics configured to close said shutter if said increase in light level beyond a threshold amount is detected.

16. The head mounted display of claim 14, further comprising a light sensor, wherein said electronics is configured to monitor output of said light sensor for an increase in light level beyond a threshold amount, said electronics configured to close said shutter if said increase in light level beyond a threshold amount is detected.

17. The head mounted display of claim 14, wherein said increase in light level comprises an increase above a threshold set by the user.

18. The head mounted display of claim 14, wherein said increase in light level comprises an increase of a certain amount above the ambient light level.

\* \* \* \* \*